US012400359B2

(12) United States Patent
Johannesson et al.

(10) Patent No.: US 12,400,359 B2
(45) Date of Patent: Aug. 26, 2025

(54) METHOD AND ARRANGEMENTS FOR DETERMINING INFORMATION REGARDING AN INTENSITY PEAK POSITION IN A SPACE-TIME VOLUME OF IMAGE FRAMES

(71) Applicant: SICK IVP AB, Linköping (SE)

(72) Inventors: Mattias Johannesson, Linköping (SE); Jens Edhammer, Linköping (SE)

(73) Assignee: SICK IVP AB, Linköping (SE)

( * ) Notice: Subject to any disclaimer, the term of this patent is extended or adjusted under 35 U.S.C. 154(b) by 374 days.

(21) Appl. No.: 18/048,232

(22) Filed: Oct. 20, 2022

(65) Prior Publication Data
US 2023/0186510 A1 Jun. 15, 2023

(30) Foreign Application Priority Data
Dec. 15, 2021 (EP) .................................... 21214925

(51) Int. Cl.
*G06T 7/73* (2017.01)
*G01C 3/02* (2006.01)
(Continued)

(52) U.S. Cl.
CPC .................. *G06T 7/73* (2017.01); *G01C 3/02* (2013.01); *G06T 7/521* (2017.01); *G06T 7/55* (2017.01); *G06T 2207/30241* (2013.01)

(58) Field of Classification Search
CPC .. G06T 7/73; G06T 7/55; G06T 7/521; G06T 2207/30241; G06T 7/246; G06T 5/70;
(Continued)

(56) References Cited

U.S. PATENT DOCUMENTS 8,723,938 B2 * 5/2014 Lee .................. G01N 33/54373
   348/69
10,062,164 B2 * 8/2018 Quellec ................. G06T 7/0012
(Continued)

FOREIGN PATENT DOCUMENTS

CN    113091634 A  *  7/2021  ......... G01B 11/2441
CN    115854921 A  *  3/2023
EP    2063220 B1     6/2017

OTHER PUBLICATIONS

Davis; J et al. "Spacetime Stereo: a unifying framework for depth from triangulation", Jan. 1, 2003, IEEE (Year: 2003).*
(Continued)

*Primary Examiner* — John Villecco
*Assistant Examiner* — Alejandro Hernandez
(74) *Attorney, Agent, or Firm* — DUANE MORRIS LLP; Gregory M. Lefkowitz

(57) ABSTRACT

Determination of information regarding an intensity peak position in a space-time volume (360; 361) formed by image frames generated by an image sensor (331) from sensing of light reflected from a measure object (320) as part of light triangulation. The space-time volume (360; 361) is further associated with space-time trajectories relating to how feature points of the measure object (320) map to positions in the space-time volume (360; 361). A first hypothetical intensity peak position, HIPP1, (551*a*; 651*a*) is obtained (701 in said space time volume (360; 361). A first space time analysis position, STAP1, (552*a*; 652*a*) is computed (702) based on space-time analysis performed locally around the HIPP1 (551*a*; 651*a*) and along a first space time trajectory associated with the HIPP1 (551*a*, 651*a*). Said information regarding the intensity peak position is determined (703) based on the HIPP1 (551*a*; 651*a*) and the STAP1 (552*a*; 652*a*).

12 Claims, 9 Drawing Sheets

(51) Int. Cl.
*G06T 7/521* (2017.01)
*G06T 7/55* (2017.01)

(58) Field of Classification Search
CPC .... G06T 7/70; G06T 7/20; G01C 3/02; G01S 17/48; G01S 17/46; G01S 17/06; G01S 17/02; G01S 17/481; G01S 17/89; G01S 17/88; G01B 11/2518; G01B 11/25; G01B 11/24

See application file for complete search history.

(56) References Cited

U.S. PATENT DOCUMENTS

| | | | | |
|---|---|---|---|---|
| 11,348,269 | B1* | 5/2022 | Ebrahimi Afrouzi | G01S 17/48 |
| 2006/0074312 | A1* | 4/2006 | Georgescu | G06T 7/215 |
| | | | | 600/437 |
| 2010/0310126 | A1* | 12/2010 | Johannesson | G01S 17/50 |
| | | | | 382/103 |
| 2013/0058548 | A1* | 3/2013 | Garg | G06T 11/006 |
| | | | | 382/128 |
| 2015/0043006 | A1* | 2/2015 | de Groot | G01B 9/0209 |
| | | | | 356/497 |
| 2015/0253428 | A1* | 9/2015 | Holz | G01S 7/483 |
| | | | | 356/5.01 |
| 2016/0182889 | A1* | 6/2016 | Olmstead | H04N 19/17 |
| | | | | 348/47 |
| 2018/0050255 | A1* | 2/2018 | Maani | G06V 40/23 |
| 2018/0325354 | A1* | 11/2018 | Saito | G06T 7/35 |
| 2018/0336691 | A1* | 11/2018 | Suzuki | G06T 7/521 |
| 2022/0012456 | A1* | 1/2022 | Knowles | G02B 21/008 |
| 2022/0067344 | A1* | 3/2022 | Doumi | G06T 7/90 |
| 2022/0252524 | A1* | 8/2022 | Fujimoto | G01N 21/95 |
| 2022/0260481 | A1* | 8/2022 | Ozcan | G06V 20/698 |
| 2022/0283443 | A1* | 9/2022 | Xu | G02B 27/58 |
| 2023/0054256 | A1* | 2/2023 | Jongsma | G06T 15/06 |
| 2023/0202196 | A1* | 6/2023 | Koyama | B41J 2/325 |
| | | | | 347/213 |
| 2023/0243923 | A1* | 8/2023 | Lugez | H04N 13/254 |
| 2023/0247186 | A1* | 8/2023 | Murhed | G01B 11/2518 |
| | | | | 348/46 |
| 2023/0408695 | A1* | 12/2023 | Keränen | G01S 17/48 |
| 2024/0255639 | A1* | 8/2024 | Hsu | G01S 17/06 |
| 2025/0047986 | A1* | 2/2025 | Murhed | H04N 23/10 |

OTHER PUBLICATIONS

Curless, B., et al., "Better optical triangulation through spacetime analysis," Computer Vision, 1995. Proceedings., Fifth International Conference on Cambridge, MA, USA Jun. 20-23, 1995, Los Alamitos, CA, USA,IEEE Comput. Soc, US, Jun. 20, 1995 (Jun. 20, 1995), pp. 987-994, XP010147003 ISBN: 978-0-8186-7042-8.

Benderius, B., "Laser Triangulation Using Spacetime Analysis," Department of Electrical Engineering, Linköpings University, Dec. 21, 2007, pp. 1-73, XP055925146, Retrieved from the Internet: URL:https://www.diva-portal.org/smash/get/ diva2:17262/ FULLTEXT01.pdf.

Taubin, G., et al., "Shape from Depth Discontinuities," Division of Engineering, Brown University, In: Nielsen, F. (eds) Emerging Trends in Visual Computing. ETVC 2008. Lecture Notes in Computer Science, vol. 5416. Springer, Berlin, Heidelberg. https://doi. org/10.1007/978-3-642-00826-9_9.

* cited by examiner

METHOD AND ARRANGEMENTS FOR DETERMINING INFORMATION REGARDING AN INTENSITY PEAK POSITION IN A SPACE-TIME VOLUME OF IMAGE FRAMES

TECHNICAL FIELD

Embodiments herein concern a method and arrangements for determining information regarding an intensity peak position in a space-time volume formed by image frames generated from light triangulation performed by an imaging system, more particularly are embodiments herein based on space time analysis in the space-time volume.

BACKGROUND

Industrial vision cameras and systems for factory and logistic automation may be based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise such information associated with the position of the pixel in the image and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by so called "sheet of light", e.g. laser-line, 3D triangulation. Laser is often preferred but also other light sources able to provide the "sheet of light" can be used, e.g. light sources able to provide light that stays focused and do not spread out to much, or in other words, light that is "structured", for example light provided by a laser or Light Emitting Diode (LED).

3D machine vision systems are often based on such sheet of light triangulation. In such a system there is a light source illuminating the object with a specific light pattern, such as the sheet of light as the specific light pattern, e.g. resulting in a light, or laser, line on the object and along which line 3D characteristics of the object can be captured, corresponding to a profile of the object. By scanning the object with such a line, i.e. performing a line scan, involving movement of the line and/or object, 3D characteristics of the whole object can be captured, corresponding to multiple profiles.

3D machine vision systems or devices that use a sheet of light for triangulation may be referred to as systems or devices for 3D imaging based on light, or sheet of light, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, e.g. corresponding to a laser line, that was reflected from the object. The position in the image of a detected peak will map to a position on the object from where the light resulting in the peak was reflected.

A laser triangulating camera system, i.e. an imaging system based on light triangulation, projects a laser line onto an object to create height curves from the surface of the target object. By moving the object relative to the cameras and light sources involved, information on height curves from different parts of the target object can be captured by images and then combined and used to produce a three dimensional representation of the target object.

This technique may be described as grabbing of images of the light, typically a laser line, when it is projected onto and reflected by the object and then in the images extract positions of the reflected laser line. This is normally accomplished by identifying intensity peaks in the image frames using any conventional peak finding algorithm, and typically performed per column of the sensor. However, when there are discontinuities, either geometrical, such as at the edge of a box, or intensity, such as a chess pattern, with dark to bright transitions, the conventional method suffers from artefacts due to that the laser line has a width which will cover multiple pixels in the images.

One solution to reduce such artefacts and an alternative to using conventional peak finding algorithms is a technique called space time triangulation or space time analysis, see e.g. CURLESS B ET AL: "Better optical triangulation through spacetime analysis" COMPUTER VISION, 1995. PROCEEDINGS., FIFTH INTERNATIONAL CONFERENCE ON CAMBRIDGE, MA, USA 20-23 Jun. 1995, LOS ALAMITOS, CA, USA, IEEE COMPUT. SOC, US, 20 Jun. 1995 (1995-06-20), pages 987-994, XP010147003 ISBN: 978-0-8186-7042-8. The idea is to analyze the time evolution of the structured, e.g. laser, light reflections, following a point through the laser line. It is utilized that the width, or profile, of the laser is imaged over time onto the sensor, corresponding to a Gaussian envelope. Thus, coordinates of an intensity peak can in principle be found by searching for the mean of a Gaussian through sensor images following trajectories corresponding to how feature points of the object are imaged on, i.e. map to, sensor coordinates over time, in other words in a space time volume. The sensor position of the peak indicates a depth and the time indicates lateral position of the center of the laser. The paper illustrates the principle very well and also provide explanation of said artefacts associated with conventional peak finding algorithms. The technique presented in the paper can a bit simplified be described by an algorithm where:

1) image frames are captured, the images forming a space time volume of space time images (each image can be captured similarly as in the case of conventional light triangulation),
2) the space time images are skewed by a predetermined space time angle,
3) the statistics of the Gaussian light intensity distribution are analyzed in the skewed coordinates and the mean or center positions are identified, representing peak positions, and
4) skewing back to the original coordinates is performed, that is, the position of the peaks, in both the row and time dimension are skewed back to the original coordinates.

Thereafter the positions can be used to produce a 3D image or model of the imaged object, in a similar manner as when peak positions have been conventionally identified.

The finding of the peak positions in the space time volume can also be described as analyzing light intensity distribution along trajectories in the space-time volume, where the trajectories in the paper are assumed to be straight lines inclined by the space time angle. More generalized, the space time analysis approach can be described as looking at a light intensity distribution along such trajectory in the space time volume and find its center position instead of looking only at intensities in and find peaks per image frame. It can be realized that such trajectory can be considered to correspond to how a feature point of imaged object will move in the space time volume, being visible in the images when it moves through the illuminant, i.e. the light, such as a laser line. It is desirable to find a position in the space time volume where the feature point passes through the center of the laser line.

Said paper teaches that, and how, the space time angle, and thus the trajectories, can be calculated analytically based on a formula having inter alia the geometrical and optical relation between the sensor and the object as well as the motion of the object as input. However, in the paper, for deriving the aforementioned formula for the space-time angle, some assumptions are made, e.g. that the sensor is orthographic and that the object moves with a constant velocity in relation to the measuring system during the execution of the optical triangulation. The analytically derived spacetime angle, and thus derived trajectories, do not account for secondary effects, such as for the projection via a standard imaging lens, secondary reflections and/or imperfections of the optics connected to the sensor and is not suitable to apply in case of varying, i.e. not constant, velocity of the object in relation to the measuring system.

EP 2 063 220 B1 discloses solutions to some problems with the original space time analysis technique and shows how trajectories in the space-time volume of measure images may be established by a determination method using a reference object, for use in a calibration stage, with system settings etc. being the same as to be used for measure objects. Hence, rather than deriving a new formula for analytically determining the space-time angle or trajectories, the solution is based on extension of trajectories determined from recorded measure data from the reference object. The approach allows for greater flexibility and can also handle such secondary effects etc. mentioned above. Different trajectories can be determined for different areas of the measure images and the space time volume. Furthermore, the method can be used for determining trajectories which are not linear. Embodiments presented in EP 2 063 220 B1 are based on assumption of trajectory extension, determining an amount of artefacts when using the assumption and repeat with new assumption etc., until the amount is below a predetermined threshold value or has reached a minimum. When trajectories, or corresponding space time angle, have been determined, these can be followed to find out about light intensity distribution and identify center position thereof in a space time volume of measure images of a measure object. The main principle is the same as for the original method disclosed in said paper, but since more practically useful trajectories can be determined, the result is improved practical applicability of the space time analysis approach for intensity peak detection.

However, solutions based on space time analysis as in said paper and in EP 2 063 220 B1 are associated with some drawbacks and practical problems. They are for example based on having access to the full space time volume and thus a full set of measure images forming it. The solutions are thereby difficult to implement near, or integrated with, the sensor. They also require processing of quite large amount of data and are memory and computational heavy compared to conventional peak finding algorithms. When speed is important, the prior art approaches may not be suitable.

SUMMARY

In view of the above, an object is to provide one or more improvements or alternatives to the prior art, such as providing a method based on light triangulation and space time analysis that is more suitable for practical implementation.

According to a first aspect of embodiments herein, the object is achieved by a method for determining information regarding an intensity peak position in a space-time volume formed by image frames generated by an image sensor from sensing of light reflected from a measure object as part of light triangulation. Said light triangulation being based on movement of at least a light source and/or the measure object in relation to each other so that at different consecutive time instants, different consecutive portions of the measure object are illuminated by the light source and reflected light from the measure object is sensed by the image sensor. Each image frame of the space time volume is thereby associated both with a respective such time instant and with a respective portion of the measure object from which the image sensor sensed light at the respective time instant. Said space-time volume is further associated with space-time trajectories relating to how feature points of the measure object map to positions in the space-time volume. It is obtained a first hypothetical intensity peak position (HIPP1) in said space time volume. It is then computed a first space time analysis position (STAP1) based on space-time analysis performed locally around the first hypothetical intensity peak position and along a first space time trajectory. The first space time trajectory being a space time trajectory of said space time trajectories that is associated with, i.e. pass through, the first hypothetical intensity peak position. Said information regarding the intensity peak position is determined based on the HIPP1 and the computed STAP1.

According to a second aspect of embodiments herein, the object is achieved by a computer program comprising instructions that when executed by one or more processors causes one or more devices to perform the method according to the first aspect.

According to a third aspect of embodiments herein, the object is achieved by a carrier comprising the computer program according to the second aspect.

According to a fourth aspect of embodiments herein, the object is achieved by one or more devices for determining information regarding an intensity peak position in a space-time volume formed by image frames generated by an image sensor from sensing of light reflected from a measure object as part of light triangulation. Said light triangulation being based on movement of at least a light source and/or the measure object in relation to each other so that at different consecutive time instants, different consecutive portions of the measure object are illuminated by the light source and reflected light from the measure object is sensed by the image sensor. Each image frame of the space time volume is thereby associated both with a respective such time instant and with a respective portion of the measure object from which the image sensor sensed light at the respective time instant. Said space-time volume is further associated with space-time trajectories relating to how feature points of the measure object map to positions in the space-time volume. Said one or more devices are configured to obtain a first hypothetical intensity peak position (HIPP1) in said space time volume. Said one or more devices are configured to are further configured to compute a first space time analysis position (STAP1) based on space-time analysis performed locally around the HIPP1 and along a first space time trajectory. The first space time trajectory being a space time trajectory of said space time trajectories that is associated with the HIPP1. Moreover, said one or more devices are configured to determine said information regarding the intensity peak position based on the HIPP1 and the computed STAP1.

In some embodiments, the determination of the information regarding the intensity peak position comprises computation of a first position difference, PD1, in the space-time volume, between the HIPP1 and the computed STAP1. If the computed PD1 is below or equal to a certain threshold value, that may be predetermined, there is provision of the HIPP1 as a determined intensity peak position. If PD1 instead is above said threshold value, a new HIPP2 may be obtained, e.g. selected, closer to the STAP1. By one or more iterations, according to some embodiments, further STAP(s) and PD(s), e.g. a STAP2 and PD2 based on space-time analysis locally around HIPP2, can be provided, the PD2 compared to the threshold, etc. This way improved HIPPs can be accomplished and the result can be as good or even better as from conventional space time analysis. At the same time embodiments herein can be implemented more efficiently than conventional space-time analysis, with less resources, and are better adapted for real time, or near real time, execution. There is no need to have access to a complete space-time volume of image data to operate on, it is sufficient with image data locally around each HIPP. This facilitates implementation in close connection with the image sensor, operating on subsets of image frames provided by the image sensor and on image data of partial space-time volumes formed by these image frames.

In some embodiments, the determination of the information regarding the intensity peak position comprises provision of a comparison between the HIPP1 and the computed STAP1 as a reliability indicator indicating how reliable the HIPP1 is as intensity peak position. These embodiments may be particularly advantageous when HIPP1 has been determined by a conventional peak finding algorithm since it provides valuable information about how good or bad the algorithm was in finding reliable peaks and/or that can be used to identify peak positions that are not reliable so they e.g. can be excluded and not used, or be rectified and/or replaced.

Thus embodiments herein not only enable improved and more correct peak positions than possible through conventional peak finding algorithms thanks to that the embodiments are based on space-time analysis, they also facilitate practical implementation and can additionally, or alternatively, be used to find out about reliability or quality of a peak position determined according to a conventional peak finding algorithm, or determined based on embodiments herein with iterations.

BRIEF DESCRIPTION OF THE DRAWINGS

Examples of embodiments herein are described in more detail with reference to the appended schematic drawings, which are briefly described in the following.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Figure 1:
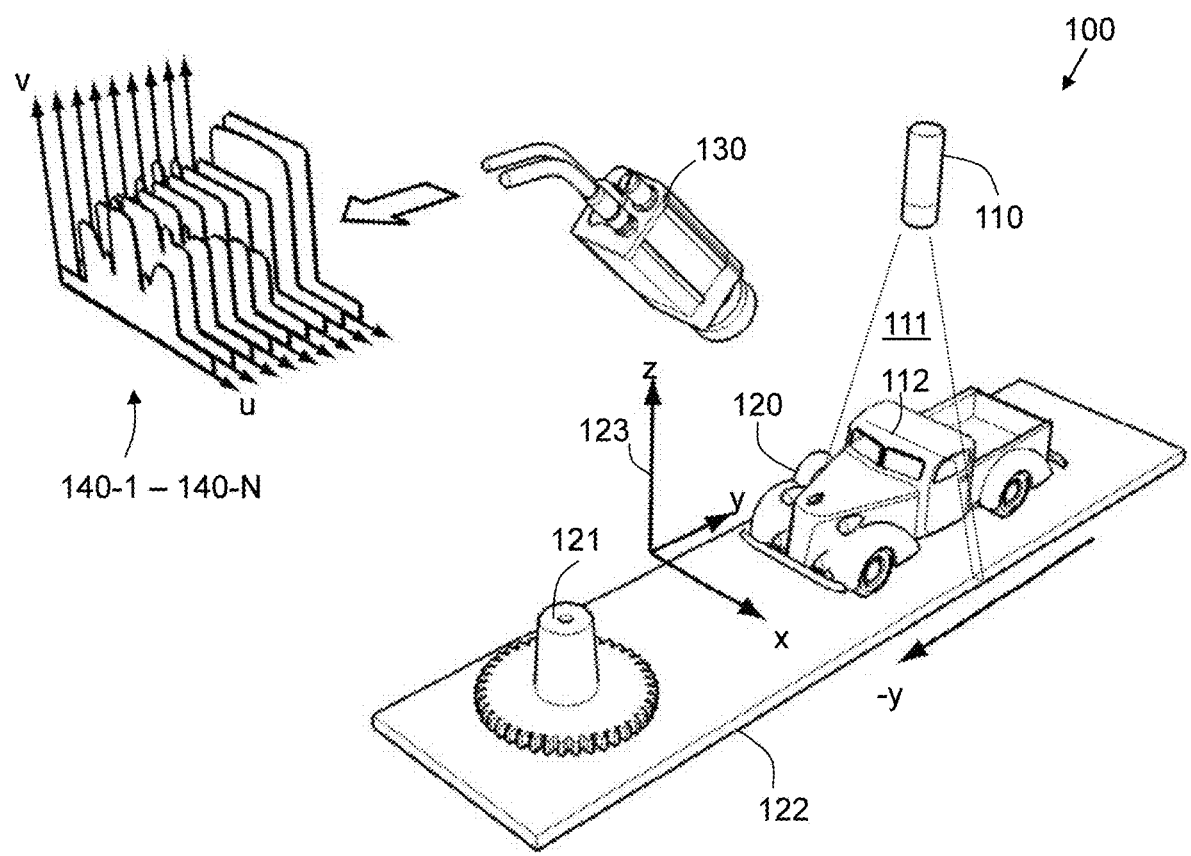
FIG. 1 schematically illustrates an example of a prior art imaging system that also can be used to provide images relevant for embodiments herein.

FIG. 1 schematically illustrates an example of such type of imaging system as mentioned in the Background, namely an imaging system 100, for 3D machine vision, based on light triangulation for capturing information on 3D characteristics of target objects. The system can be used for providing images that embodiments herein, described further below, can operate on. The system 100 is in the figure shown in a situation of normal operation, i.e. typically after calibration has been performed and the system is thus calibrated. The system 100 is configured to perform light triangulation, here in the form of sheet of light triangulation as mentioned in the Background. The system 100 further comprises a light source 110, e.g. a laser, for illuminating objects to be imaged with a specific light pattern 111, in the figure exemplified and illustrated as a sheet of light. The light may, but not need to be, laser light. In the shown example, the target objects are exemplified by a first measure object 120 in the form of a car and a second measure object 121 in the form of a gear wheel construction. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the sheet of light, results in a light line 112 on the first measure object 120. The specific light pattern 111 is reflected by the object, more specifically by portions of the object at the intersection, i.e. at the light line 112 in the shown example. The measuring system 100 further comprises a camera 130 comprising an image sensor (not shown in FIG. 1). the camera and image sensor are arranged in relation to the light source 110 and the objects to be imaged so that the specific light pattern, when reflected by the objects, become incident light on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the specific light pattern 111 will at the light line 112 on a portion of the car roof of the first measure object 120 be reflected towards the camera 130 and image sensor, which thereby may produce and provide image data with information about said portion of the car roof. With knowledge of operating conditions and geometries of the measuring system 100, e.g. how image sensor coordinates relate to world coordinates, such as coordinates of a coordinate system 123, e.g. Cartesian, relevant for the object being imaged and its context, the image data may be converted to information on 3D characteristics, e.g. a 3D shape or profile, of the object being imaged in a suitable format. The information on said 3D characteristics, e.g. said 3D shape(s) or profile(s), may comprise data describing 3D characteristics in any suitable format.

By moving e.g. the light source 110 and/or the object to be imaged, such as the first measure object 120 or the second object 121, so that multiple portions of the object are illuminated and cause reflected light upon the image sensor, in practice typically by scanning the objects, image data describing a more complete 3D shape of the object may be produced, e.g. corresponding to multiple, consecutive, profiles of the object, such as the shown profile images 140-1-140-N of the first measure object 120, where each profile image shows a contour of the first object 120 where the specific light pattern 111 was reflected when the image sensor of the camera unit 130 sensed the light resulting in the profile image. As indicated in the figure, a conveyor belt 122 or similar may be used to move the objects through the specific light pattern 112, with the light source 110 and the camera unit 130 typically stationary, or the specific light pattern 111 and/or the camera 130 may be moved over the object, so that all portions of the object, or at least all portions facing the light source 110, are illuminated and the camera receives light reflected from all parts of the object desirable to image.

As understood from the above, an image frame provided by the camera 130 and its image sensor, e.g. of the first measure object 120, may correspond to any one of the profile images 140-1-140-N. As mentioned in the Background, each position of the contour of the first object shown in any of the profile images 140-1-140-N are typically determined based on identification of intensity peaks in image data captured by the image sensor and on finding the positions of these intensity peaks. The system 100 and conventional peak finding algorithms are typically configured to in each image frame search for an intensity peak per pixel column. If sensor coordinates are u, v and for example u, as indicted in the figure, corresponds to pixel positions along rows in the image sensor and v corresponds to pixel positions along columns, there is for each position u of an image frame searched for peak position along v and the identified peaks in an image frame may result in one such clean profile image as shown in the figure, and the total of image frames and profile images can be used to create a 3D image of the first object 120.

Figure 2:
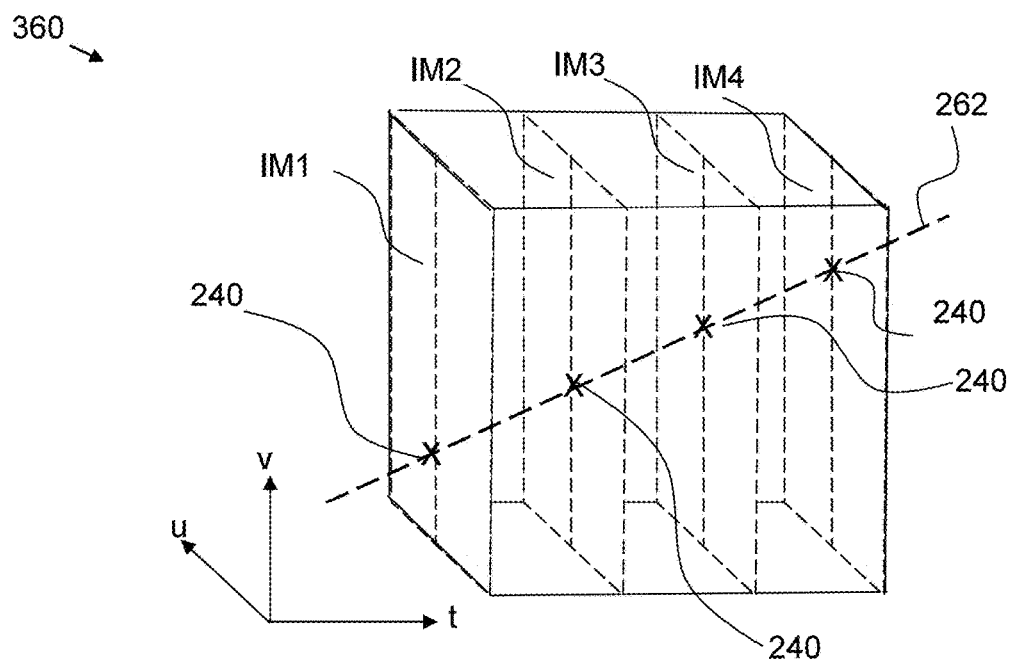
FIG. 2 schematically shows a prior art example of a space time volume formed by images frames and with a space time trajectory for space time analysis.

FIG. 2 schematically illustrates a set of image frames or measure images, e.g. generated by the imaging system 100. It is here as example shown four images or image frames IM1-IM4 at four time instants, e.g. t1-t4, respectively. Each image frame may be generated by the image sensor of the camera 130. The image frames may image a measure object, e.g. the measure object 120, and each image frame may thus contain information in the form of sensed light that can be used to create one of the profile images 140. The images IM1-1M4 are stacked and form a space-time volume (SW) 360 of image frames. Each image frame IM has an image transversal dimension u and an image longitudinal dimension v, hence the space-time volume 360 has three dimensions, the time dimension t being the third dimension. Since the measure object, e.g. the first measure object 120, moves in relation to the camera 130 and light source 110 during the generation of the measure images IM1-1M34, an example feature point 240 of the imaged measure object will map to an example space time trajectory 262 in the space-time volume 360 with (u, v, t) coordinates. At some positions in the STV 360, reflections from the example feature point have resulted in higher intensities and formed an intensity peak. Note that FIG. 2 is only to exemplify and visualize some relations used in space time analysis. In practice a space time volume with images of a complete measure object may comprise hundreds of image frames and at least many more than just four. Also, in the example, trajectories may be parallel and straight and not change in u, whereby each one, just as the trajectory 262 shown as an example in the figure, can be described by an angle, which is a situation used in the original space time analysis paper mentioned in the Background. However, as indicated above, in practice, a trajectory may change position also in u and need not be straight through the space time volume. Such trajectories can e.g. be determined in a calibration stage using a reference object, as also discussed in the Background.

Figure 3A:
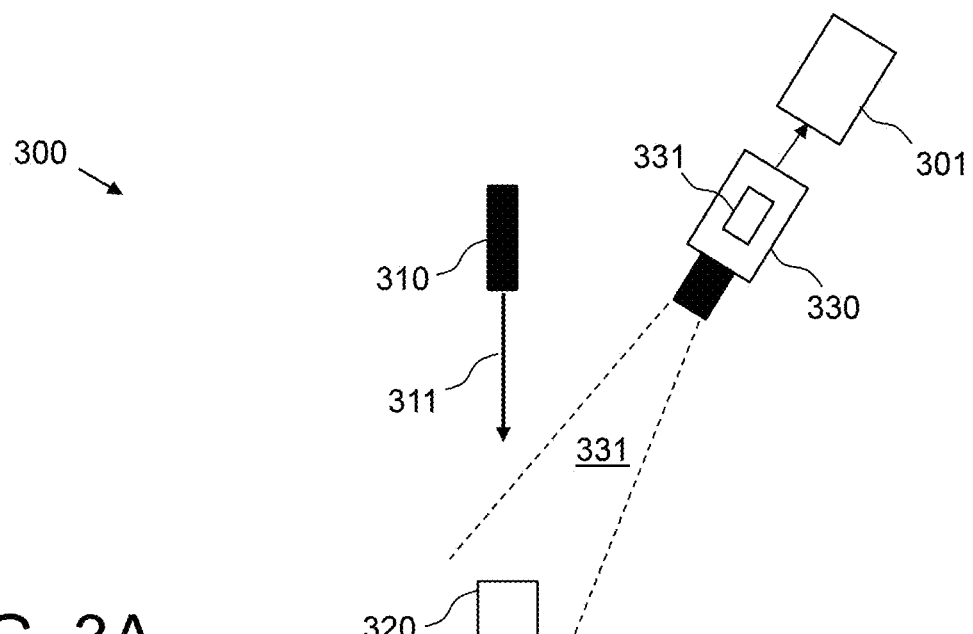
FIGS. 3A-B schematically illustrates an simplified example of a an imaging system that can be configured to carry out embodiments herein.

FIG. 3A schematically illustrates an exemplary imaging system 300, based on light triangulation for capturing information on 3D characteristics of one or more measure objects. The imaging system 300 may be used for implementing embodiments herein. The shown system corresponds to a basic configuration with one light source 310 and one camera 330, arranged at certain positions, respectively, is suitable and/or configured for light triangulation, e.g. laser triangulation. The system 300 may thus correspond to the system 100 in FIG. 1 but configured to perform according to embodiments herein. There is shown a measure object 320, that may correspond to the first measure object 120, and that is shown located at least partly within field of view 331 of the camera 230. The light source 210 illuminates the measure object with light 311 in the form of a specific light pattern, e.g. a sheet of light and/or laser line that is reflected by the measure object and the reflected light is captured by the camera 330. The measure object 320 is illuminated and images may be captured, as in conventional light triangulation. The system may e.g. be configured to move the measure object 320, such as by means of a conveyor belt, so it thereby becomes completely illuminated by light from the light source 310, and/or the system may be configured to move the light source and/or camera with sensor to accomplish the same thing. The light source 310 and camera 330 are typically arranged at fix positions in relation to each other.

The camera 330 may be a prior art camera, e.g. correspond to the camera 130 in the system 100 of FIG. 1 and may comprise an image sensor 331 that may be the same or similar image sensor discussed above in relation to FIG. 1. Image frames and/or information derived from image frames provided by the camera 330 and the image sensor 331 may be desirable to transfer, e.g. transmit, for further processing outside the camera 330, e.g. to a computing device 301, such as a computer or similar. Such further processing may additionally or alternatively be performed by a separate computing unit or device (not shown), i.e. separate from the image processor 131, but still comprised in, e.g. integrated with, the camera 330, or a unit comprising the camera 330.

Before describing embodiments herein in detail, the prior art and problems indicated in the Background will be elaborated upon and some principles that embodiments herein are based on will be introduced and explained.

Figure 3B:
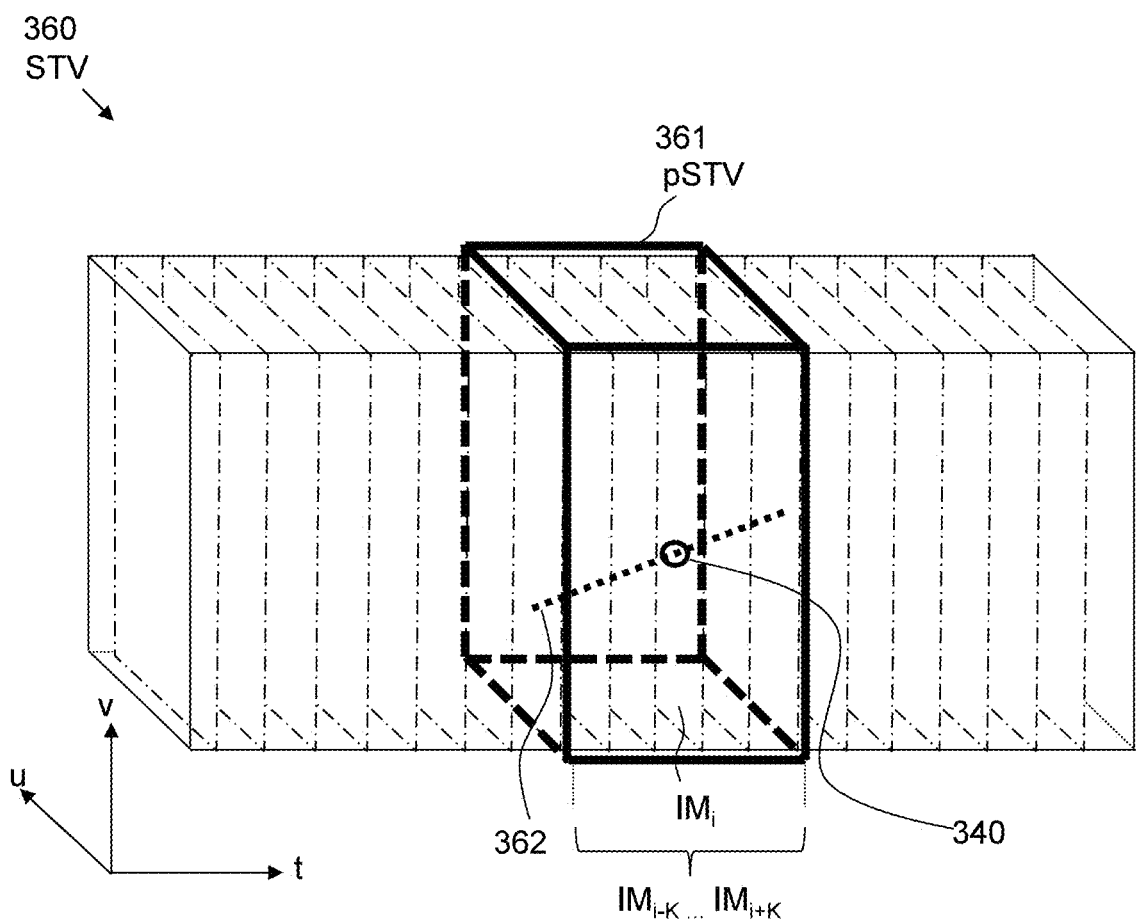

FIG. 3B schematically illustrates a set of image frames. e.g. generated by the imaging system 300 when imaging the measure object 320. The shown image frames form a space time volume, SW, 360 that may comprise image frames from a full scan of the measure object 320. In the figure it is also shown example of a partial space time volume (pSTV) 361 that is a subset of the total, or full, STV 360. The pSTV may e.g. be formed by a predetermined number of sequential image frames of the total space time volume, e.g. a subsequence of the total sequence of image frames forming the STV 360, e.g. image frames $IM_{i-K}$ . . . $IM_{i+L}$, around, such as centered around, an image frame IMi of the total of image frames, as illustrated in the figure for a situation where L=K. For example, if it is assumed that the total space time volume for an imaged measure object, e.g. STV 360, is formed by 500 image frames IM1-1M500, a first pSTV can be formed from a subsequence of image frames IM1-1M15, a second STV be formed from a subsequence of image frames 1M2-1M16, a third from 1M3-1M17, etc.

In the pSTV 361 it is shown an example position 340, e.g. located in $IM_i$, and also a partial space time trajectory 362 that is a trajectory for an example feature point 340 that thus map to positions in the pSTV 361 and in the figure is shown mapping to a position in IMi. It is named a partial trajectory since it only relates to image data of the partial STV 362, but can be based on and be part of space time trajectories for the STV 360, i.e. the whole STV, and e.g. be part of or formed based on a trajectory of the STV 360 that passes through the pSTV 361.

In the prior art teachings mentioned in the Background, a full stack of image frames from the sensor is used, e.g. the complete STV 360, whereas embodiments herein are applicable to part of the stack and e.g. the pSTV 361. Embodiments herein can beneficially be implemented in a pipelined manner to cover a full stack of image frames of a complete measure object.

Positions of intensity peaks located in a pSTV can be determined based on embodiments herein even though embodiments herein are based on the prior art space time analysis principle. At the same time when intensity peak positions are determined and/or information about intensity peak positions are determined for the first pSTV according to embodiments herein, image frame(s) of a second subset can be sensed and provided by the image sensor. Hence, less data is needed to be stored and provided at the same time and positions can be identified before all image frames and the full space time volume is available.

Figure 4:
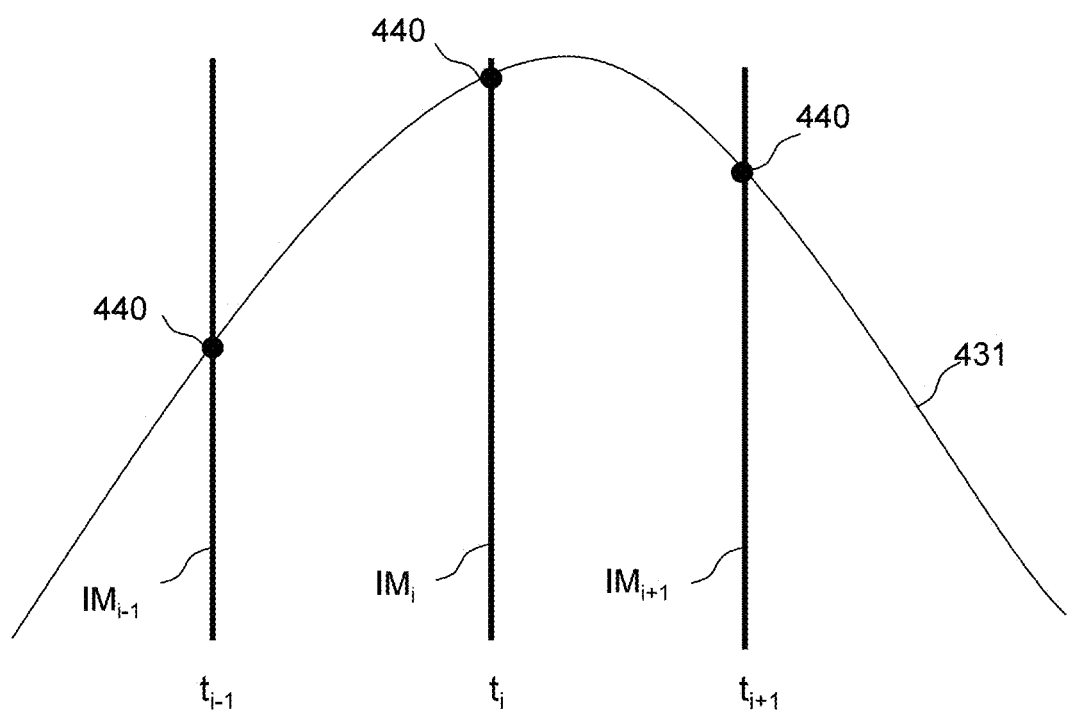
FIG. 4 is a schematical illustration to enhance understanding of a principle behind space time analysis and embodiments herein.

FIG. 4 is a schematical illustration to enhance understanding of principles and relations behind space time analysis and embodiments herein. The figure can be considered representing a subset or subsequence of a space time volume of a sequence of image frames from laser triangulation, such as resulting from operation of the imaging system 300 and imaging of the measure object 320. The subsequence may e.g. be part of the STV 360 and here involves three image frames $IM_{i-1}$ . . . $IM_i$+1. Assume this subsequence has captured a feature point 440 of the measure object when it moved through a laser line 431, or laser sheet of light. The feature point 440 will follow a trajectory in the space time volume and be visible where it was illuminated. However, since the laser line 431, as shown in the figure, has a width, it will illuminate the feature point 440 not only at a single occasion or point in time. The intensity will also vary over the width as attempted to be illustrated by the bell shape of the laser line 431 in the figure. When light is reflected back from the measure object, the light distribution can be affected as well.

The feature point 440 can thus be seen as sampling the laser line 431 over its width, resulting in that the feature point 440 in the images IM1-3 will be sampled at 3 different light intensities depending on the light illuminating the feature point 440. The intensity samples are captured at time instants $t_{i-1}$, $t_{+1}$, i.e. when the image frames were captured as schematically illustrated in the figure. The same feature point 440 may thus give rise to 3 intensity values at different positions in three different consecutive image frames.

Note that "up" in the figure is intensity level, not position in the image frame, or sensor plane, although these positions generally change as well when the imaged feature point 440 follows a trajectory in the space time volume through said image frames. The three image frames are shown just to indicate belonging of the feature point 440 samples to these image frames. Regarding a space time trajectory that a feature point moves along, an imaging system may be arranged so that feature points moves in the real world e.g. only or substantially only in a y-direction, e.g. as indicated in FIG. 1, in addition to that it also moves in time of course. Generally this results in that the feature point in sensor coordinates and the space time volume moves in both u and v, in addition to in time t, i.e. its space time trajectory may change in all coordinates (u, v, t).

As further realized from FIG. 4, the actual position in time when the feature point 440 passes the center of the laser line is between the time instants $t_i$ and $t_{i+1}$ associated with image frames $IM_i$ and $IM_{i+1}$, respectively. The center of the laser line is thus not directly sampled but can still be identified in the space time volume. Reconstruction when and where a true center passing occurs, even when this is between frames, can be accomplished by looking at multiple frames. While not limited to looking only symmetrically around the center point, this may make sense for accuracy of the detection. It can be understood that it is typically required actual samples from at least 3 image frames to be able to reconstruct the signal, i.e. light distribution in the space time volume. In practice, 5 or 7 image frames may be used as minimum, but more image frames, such as 9, 11, 15 or 31 image frames with image data may be desirable to use to form each pSTV.

With knowledge of the space time trajectories in the space time volume it is possible to follow or track feature points sampling the illuminant in directions with better knowledge of the light distribution and where the light distribution can be utilized to identify a center position. This is utilized in prior art space time analysis to find a center position of the light distribution, even though the actual center is not directly sampled in any image frame. For embodiments herein, obtaining information about a trajectory for a hypothetical intensity peak position provides information on which samples to use for reconstructing the light distribution and e.g. find its center position.

As already mentioned, conventional space time analysis is performed over the whole space time volume and a found center of light distribution along a space time trajectory can be assumed to represent an actual peak position.

In embodiments herein, however, the starting point is a first hypothetical intensity peak position (HIPP), i.e. a first HIPP or HIPP1, and the space time analysis is performed only locally and using a portion of the full space time volume. A center position identified through space time analysis, i.e. a space time analysis position (STAP) is not assumed to be a correct peak position for a feature point. The STAP is instead rather used for comparison with and to evaluate the HIPP. The position difference between them can be seen as a quality measure of the HIPP. If the measure, e.g. difference, indicates that the HIPP is too far away, it can be dismissed and/or a new refined HIPP can be provided based on the earlier HIPP and its STAP, i.e. the position identified through space time analysis. This can be repeated, or iterated, getting hypothetical peak positions that are increasingly better. Some STAPs will e.g. correspond to artefacts due to a poor first hypothetical intensity peak position. However, embodiments herein makes it possible to identify such "undesired" or false peak positions so they can be avoided to be used, or at least can have less impact when the peak positions are used to form a 3D image of a measure object. However, real peak positions can be identified through said iterations and refined hypothetical peak positions (improved hypotheses) with results similar as for conventional space time analysis, i.e. to find better peak positions than possible with only a conventional peak detecting algorithm. However, in contrast to the prior art, embodiments herein at the same have the advantage that they do not require a complete space time volume to be available until space time analysis is performed and can be utilized. It suffices with availability of and operation on local data from a subsequence of image frames that form a partial space time volume as described above.

Hence, embodiments herein can be considered based on using hypothetical intensity peak positions (HIPPs), e.g. starting with a first HIPP (HIPP1) that preferably is a peak position identified by a conventional intensity peak finding algorithm, e.g. one for finding a peak position in a column of an image frame. Then the HIPP1 is evaluated based on the result from spacetime analysis that as mentioned can be performed locally around the HIPP1 and thus only need data from said subset of image frames and thus from locally around HIPP1. Space time trajectories for the space time analysis can be determined as in the prior art and fully or partly predetermined space time trajectories can be used, e.g. determined or predetermined by using a reference object during a calibration stage prior to applying embodiments herein.

If the space time analysis indicates that a HIPP is not reliable enough, e.g. not accurate enough or of too low quality, which e.g. can be identified by a too large position difference (PD) in space time between the hypothetical intensity position and a space time analysis position (STAP). The STAP typically being a center position of light distribution found from space time analysis along the trajectory passing the HIPP. A new better hypothesis point can then be selected based in the result, new space time analysis be performed etc. That is, by iterative refinement, using space time analysis that can be performed only locally, e.g. using image data from a window around a HIPP, improved peak positions can be determined compared to conventional peak finding algorithms, with benefits similar as from application of space time analysis as in the prior art. These benefits include the benefit of using sampling points in time and space so that intensity sampling of the laser line becomes more consistent and doesn't suffer, or suffer less, from artefacts due to intensity variations and/or surface discontinuities in the measure object.

Additionally, embodiments herein can be used to provide a measure indicating the reliability and/or accuracy of a hypothetical peak position, e.g. HIPP1, provided based on a conventional peak finding algorithm or a refined hypothetical peak position according to some embodiments herein. The measure can be seen as a quality measure that e.g. can be used to discard data that result in hypothetical peak positions indicated as unreliable, incorrect and/or undesirable, which can indicate that they likely result from noise, reflections, or other phenomena known to cause artefacts in the light triangulation images. Undesired peak positions, e.g. due to artefacts resulting from secondary effect such as reflections, noise, etc. will likely never reach a stable state, even after a number of iterations as applied in some embodiments herein.

Embodiments herein may e.g. be used to provide such quality measure per position in a full space time volume for a measure object, which measures can be used to remove space-time-inconsistent positions, enabling better and more accurate 3D images of the measure object.

It was mentioned above that results with embodiments herein are similar as in conventional space time analysis. A bit surprisingly it has been found that the method according to embodiments even can have improved accuracy over conventional space time analysis. The improvement is believed to be attributed that embodiments herein do not require to skew the space time volume, and then back again, as in conventional space time analysis.

Figure 5A:
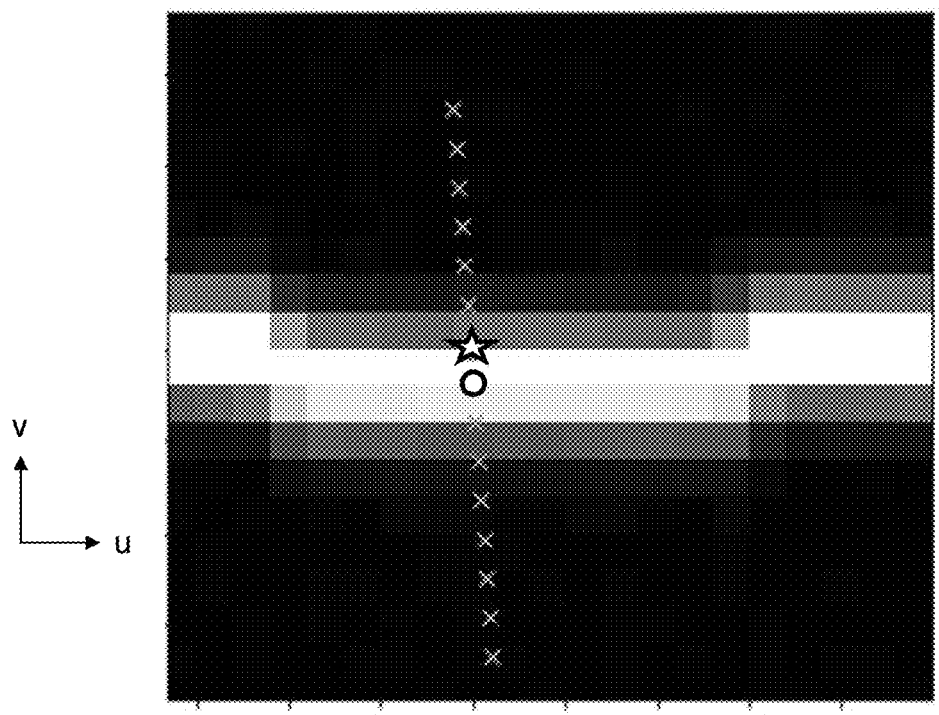
FIGS. 5A-B are a first example that schematically shows and is used to explain how hypothetical intensity peak positions (HIPPs) and space time analysis position (STAPs) can be provided and used in an iterative manner according to some embodiments herein.
Figure 5B:
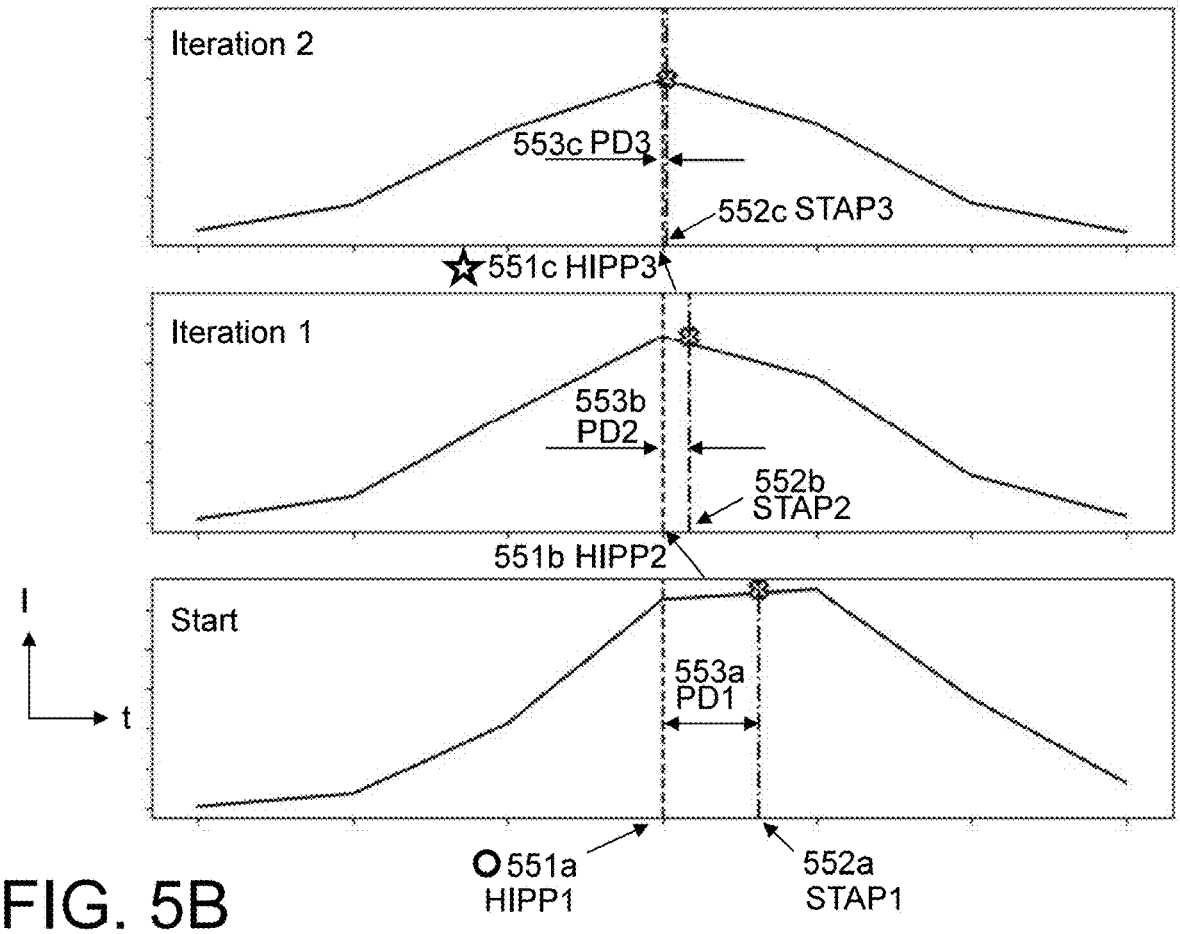

FIGS. 5A-B is a first example that schematically shows and will be used to explain how hypothetical intensity peak positions (HIPPs) and space time analysis positions (STAPs) can be provided and used in an iterative manner according to some embodiments herein, e.g. until a HIPP becomes good enough to be used as a determined intensity peak position.

FIG. 5A is a bitmap picture that shows part of an image frame, say an i:th image frame, IMi, that has captured part of reflected laser line from a measure object, such as the measure object 320 or 120. The image frame IMi is part of a space time volume (STV), more particularly part of a sequence of image frames forming a partial STV (pSTV) that is part of a full or complete STV as described above. The image frame IMi may here be part of a subsequence involving e.g. 7 image frames before and 7 image frames after IMi. In other words, image data used may be from image frames $IM_{i-7}$ to $I_{i+7}$.

The captured laser line is visible in FIG. 5A and has a width with varying intensity. In a column of IMi a first HIPP1 551a has been obtained, e.g. through a conventional peak finding algorithm, shown as a circle in FIG. 5A and also shown in FIG. 5B, in the "start" diagram. FIG. 5A also schematically shows sample points marked with thin crosses that are sample positions along a space time trajectory that passes through HIPP1 in IMi. Note that the trajectory, represented by the line of thin crosses in FIG. 5A, is shown as a projection in IMi and the time instant associated with this image frame, but the trajectory actually is a trajectory in the pSTV and also change position in time. The shown trajectory is just for visualizing the trajectory principle. Also note that when moving along the trajectory and when it e.g. passes next image frame, IMi+1, what is shown in the upper picture should be replaced and be visualized by image data from IMi+1, i.e. what is shown in FIG. 5A is only for a certain time instant in the space-time volume.

In FIG. 5A there is also shown a star corresponding to a position along the shown trajectory where a sufficiently good HIPP, here a HIPP3 551*c*, has been selected after 2 iterations according to some embodiments herein and described in the following.

Note that since the space time volume here considered is partial, the trajectory obtained for HIPP1 is a partial trajectory as well, e.g. corresponding to the partial space time trajectory 362. As already mentioned above, information about trajectories as such can be obtained as in the prior art and this information may thus be obtained before application of embodiments here. Trajectories relevant for embodiments herein can thus be considered predetermined at the time embodiments herein are applied and partial when applied to a partial space time volume.

Further note that the sampling in the space time volume is typically made by interpolation. That is, the raw data, i.e. image data of the image frames provided by the image sensor, have samples for "integer" (u,v,t) positions and resampling is made to obtain the subpixel position (u,v,t) points that may be used in the processing described in the following and relevant for embodiments herein. In other words, positions and coordinates in the space time volume and used in the processing need not be at time instants and positions of the captured image frames that correspond to exact sensor pixel positions and time instants associated with captured image frames, but can be located between these. This is similar as for space time analysis in the prior art.

In any case, the space time trajectory associated with HIPP1 551*a* passes through HIPP1 551*a* in IMi and also through image frames $IM_{i-7}$ to $IM_{i+7}$. If sampled intensities along the trajectory are plotted the result is the "start" diagram of FIG. 5B that thus shows a light, or rather intensity, distribution along the trajectory passing through HIPP1 551*a*. HIPP1 551*a* can e.g. be seen as corresponding to the point plotted in FIG. 3B for the example feature point 340 if the trajectory through HIPP1 would correspond to the partial space time trajectory 362. The center position of the light distribution shown in the start diagram of FIG. 5B is marked with a cross in this figure and corresponds to a first position according to space time analysis, i.e. a first space time analysis position, STAP1, 552*a*. This position is in the example located between IMi and IMi+1 in time. As also can be seen in the figure there is a position difference (PD), viz. a first position difference, PD1, 553*a*, between HIPP1 and STAP1. The difference is in the lowest diagram of FIG. 5A represented by a time difference along the horizontal axis. The difference is here too large for HIPP1 to be considered a reliable or accurate peak position since according to space time analysis the STAP1 should be at the HIPP1 if the HIPP1 would be an actual, i.e. correct, peak position. What is considered being a too large difference for a certain system and setup etc. can be found out from testing and routine experimentation. When a time difference and threshold is used, the threshold may be a fraction of the time between two consecutive image frames. A threshold corresponding to a max tolerated difference can be obtained prior to application of embodiments herein. For the working principle of embodiments herein a certain threshold can thus be assumed, and in practice e.g. be predetermined, at the time embodiments herein are applied.

Note that since a complete space time volume is not analyzed or may not even yet be available, it cannot be assumed that a found center of a light distribution, i.e. a STAP, as such, is an actual peak position. Instead a new HIPP is obtained if HIPP1 is not considered good enough. It has been found that it is generally more effective to select the next HIPP, in the shown example HIPP2 551*b*, as a position located along said trajectory through HIPP1 and closer to the identified center position of the light distribution, i.e. here STAP1, but not directly at or being this center position. For example, HIPP2 551*b* is preferably, and as shown in the figure, selected as a position between HIPP1 and STAP1. When HIPP2 has been selected as a position between HIPP1 and the position of STAP1 in the "start" diagram of FIG. 5B.

In a first iteration 1, HIPP2 is then used instead of HIPP1 and is shown in the center of the "iteration 1" diagram of FIG. 5B. This since, in the example, image data is resampled around HIPP2 and along the trajectory through HIPP2, whereafter basically the corresponding procedure as described above can be repeated but for HIPP2 instead of HIPP1. In the shown example, there is thus used resampled values for the image data in the "iteration 1" diagram compared the "start" diagram, which explains that the intensity value shown at HIPP1 is not exactly the same in the two diagrams. The resampled trajectory for HIPP2, corresponding to a second partial trajectory with samples from image data centered around HIPP2 results in the shown "iteration 1 diagram" of FIG. 5B.

The result is thus a new, second, light distribution along the trajectory passing HIPP2 and with HIPP2 551*b* in the center, as shown in the "iteration 1" diagram of FIG. 5B.

In said second iteration, a center of the light distribution around HIPP2 is identified, i.e. a STAP2 552*b* is found, and a position difference PD2 553*b* obtained and compared to the threshold, i.e. a similar manner as above for HIPP1. It can be seen that the difference now is smaller but still identifiable in the figure. With PD2 also too large according to the threshold, yet another similar iteration, iteration 2, is performed resulting in a HIPP3 551*c* and third light distribution as shown in the "iteration 2" diagram. This time it can be seen that there is hardly any difference between the position of HIPP3 and a STAP3 552*c*, e.g. the center of the third light distribution. This difference, i.e. PD3 553*c*, is in the example small enough and below the threshold. HIPP3 is therefore considered a reliable intensity peak position or a peak position of high quality, i.e. one for further use and that should correspond to an imaged actual feature point of the measure object located at accurate space time coordinates. The peak position according to HIPP3, i.e. the star in the upper picture of FIG. 5, thus has a much higher quality than the initial, first HIPP1, i.e. the circle.

It can also be noted that the shown light distributions have Gaussian like shapes, as expected when space time analysis is applied along trajectories.

As mentioned above, interpolation is used in the space time volume and positions used are thus not necessarily positions in a certain image frame forming the space time volume. The markers on the horizontal axis of the diagrams of FIG. 5B are thus not necessarily markers that mark positions in image frames, although the distance between the markers corresponds to the time between image frames. If HIPP1 is a position in an image frame and since it is at the center position, e.g. 0 position, in the "start" diagram of FIG. 5B then the markers of the "start" diagram correspond to space time volume positions in time where image frames are located. However, in the "iteration 1" and "iteration 2" diagrams, centered around HIPP2 and HIPP3, the markers will typically not indicate positions of the image frames.

As already mentioned above, the light distributions of the diagrams in FIG. 5B are shown with the respective HIPP centered in time. This can be seen as each HIPP is centered in time in a partial space time volume. Another way of viewing this can be to consider there being applied a time window around the HIPP, i.e. with the HIPP positioned in the center. The time window can be considered to determine pSTV and image data to be used with the HIPP. The space time volume is then sampled within this window, or in the determined pSTV, along the trajectory through the HIPP.

Figure 6A:
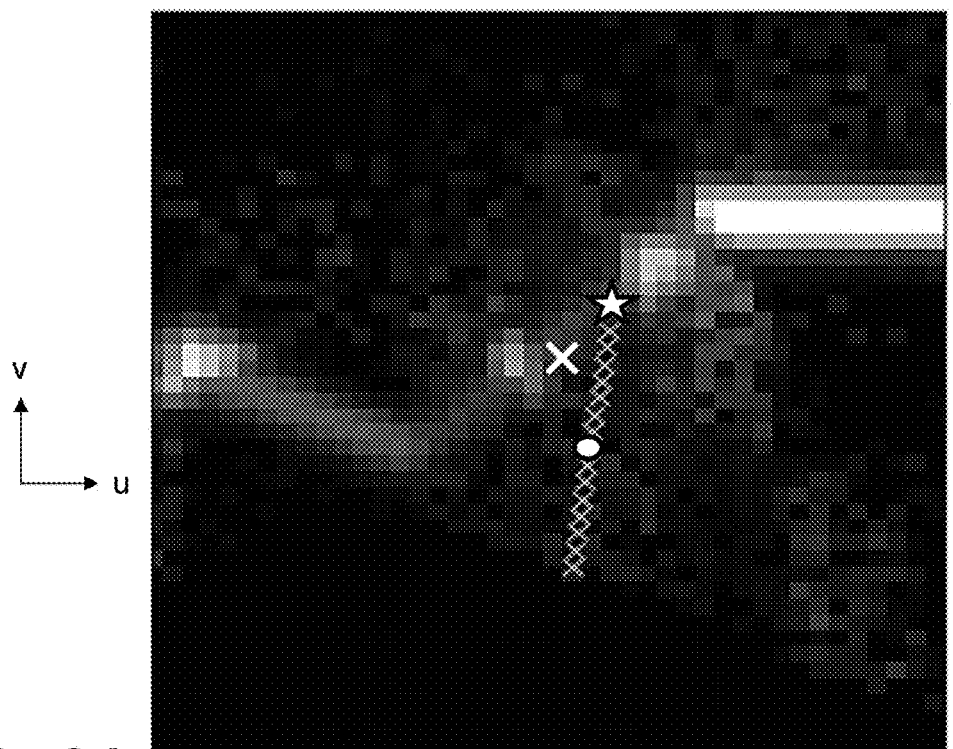
FIGS. 6A-B are a second example showing similar views as in FIG. 6 and the first example but for illustrating what it may look like when a first HIPP used is a poor starting point.
Figure 6B:
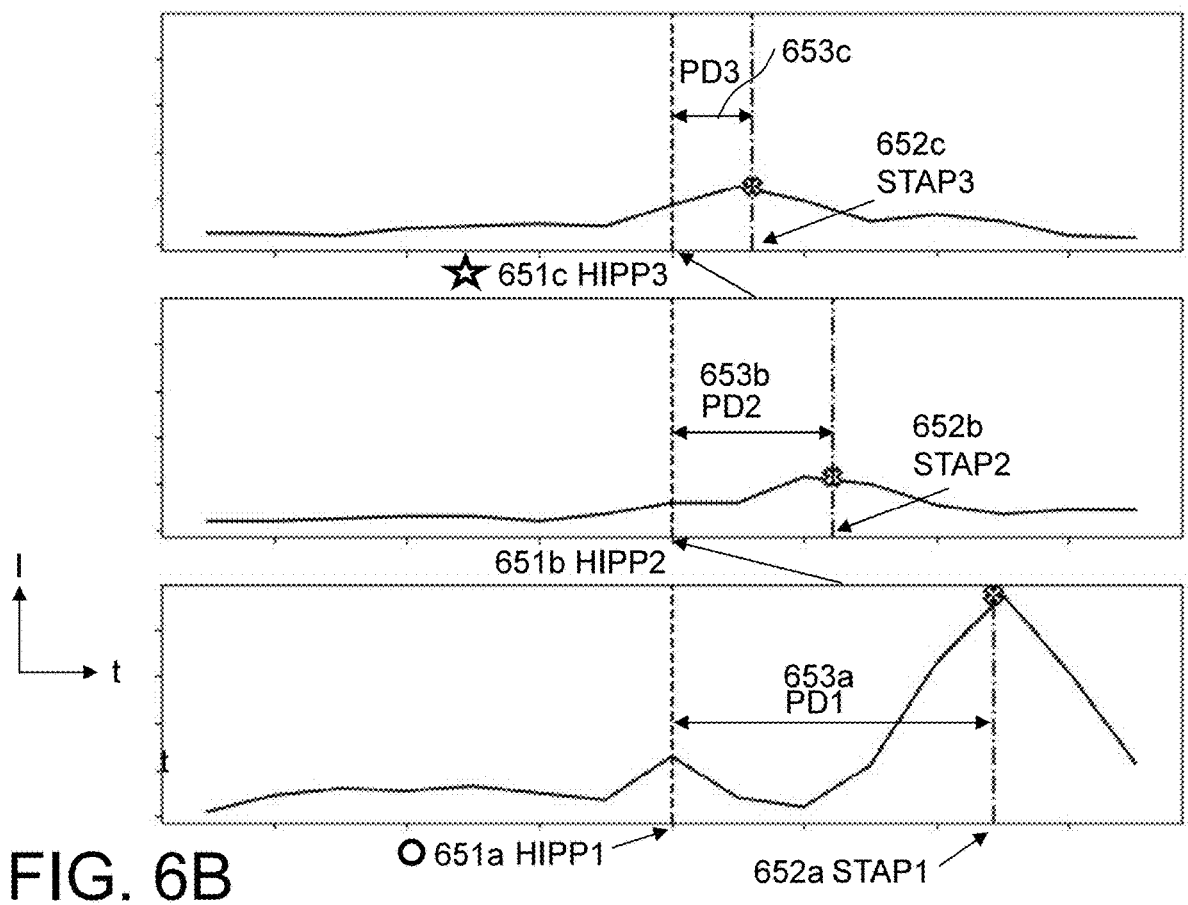

FIGS. 6A-B is a second example showing similar views as in FIGS. 5A-B and the first example, but for illustrating what it may look like when a first HIPP, here a HIPP1 651a, is a poor starting point and e.g. far away from any substantial intensity peak position. The main principles as explained above in relation to FIG. 6 are the same. The first HIPP1 is also here represented by a circle in the upper bitmap picture that may correspond to an image frame IMi. A last HIPP, here HIPP3 651c, explained further below, is shown as a star in the upper picture.

Similar as for the first example there is used image data from a sequence of image frames around HIPP1, the image frames forming a pSTV of a complete STV with HIPP1 preferably in the middle of the image frames forming the pSTV. For example, the pSTV may be formed by image frames $IM_{i-7}$ to $IM_{i+7}$ if it is assumed that IMi is the image frame shown in the upper bitmap picture and HIPP1 is located in this image frame. The iterative principle for reaching HIPP3 in the upper diagram is the same as in the first example of FIGS. 5A-B. Hence there is a PD1 653a between HIPP1 651a and a STAP1 652a, a PD2 653b between a HIPP2 651b and a STAP2 652b, and a PD3 653a between HIPP3 651c and a STAP3 652c.

In FIGS. 6A-B it can be seen that although the initial position difference PD1 653a in the "start" diagram was larger than the later position difference PD3 653c in the "iteration 2" diagram, PD3 nevertheless corresponds to a substantial difference for HIPP3. Further iterations could reduce the difference further but it is not sure that sufficient improvement can be reached, i.e. further HIPPs, if selected as above, may never result in a difference that reaches or gets below the threshold. Instead of spending time on "chasing" a peak position through numerous iterations, a peak position that that may not even be there to be found and/or will never be considered reliable, it is typically better to stop after a number of iterations even if it is only reached a difference that is above the threshold. This number may thus be a maximum number of iterations and may be predetermined. Hence, if a maximum number of iterations in the second example would be 2, there would be no more iterations performed after HIPP3 that thus become the last iteratively provided HIPP when starting from the initial HIPP, here HIPP1 in FIG. 6.

If the last HIPP, e.g. HIPP3, is associated with its difference, the difference can be used as a quality measure, or reliability and/or unreliability indicator, regarding the last HIPP.

It can be realized that already the difference for HIPP1 could be used as such reliability indicator or quality measure, which then may be for a peak position found according to a conventional peak finding algorithm. Thus embodiments herein cannot only be used to accomplish improved and more correct peak positions than possible through conventional peak finding algorithms, but can additionally or alternatively be used to find out about reliability or quality of a peak position determined according to a conventional peak finding algorithm, or determined based on embodiments herein with iterations. Such quality measures can be used to evaluate whether or not to use a determined peak position, or to what degree it shall be used, to provide a 3D image or model of the measure object.

When there are several determined peak positions, such as determined through conventional peak finding algorithm(s) and/or through iterations as above, e.g. for a complete measure object and a complete space time volume, a measure, such as a difference mentioned above, can be provided and associated with each determined position and there will thus be a quality measure or reliability indicator for each determined peak position. These measures or indicators can then be used to determine which determined peak positions to use, or to what degree, e.g. through weighting, when the determined positions are to be used to provide a 3D image or model of the measure object.

Figures 7A, 7B:
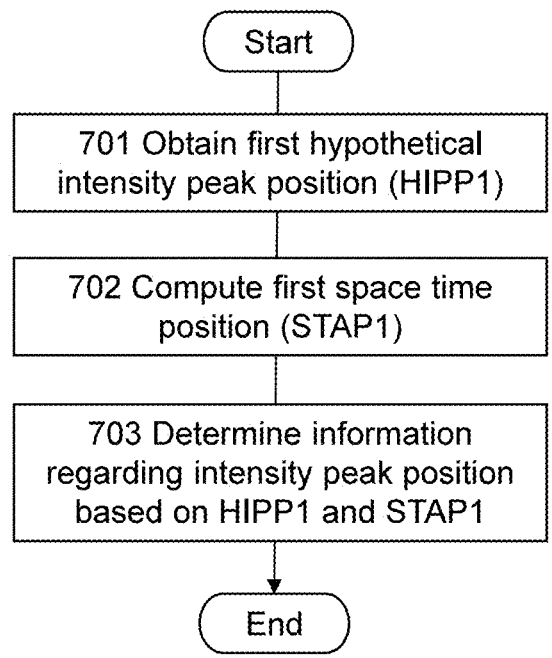
FIGS. 7A-C are flowcharts schematically illustrating embodiments of a method based on the above and according to embodiments herein
Figure 7C:
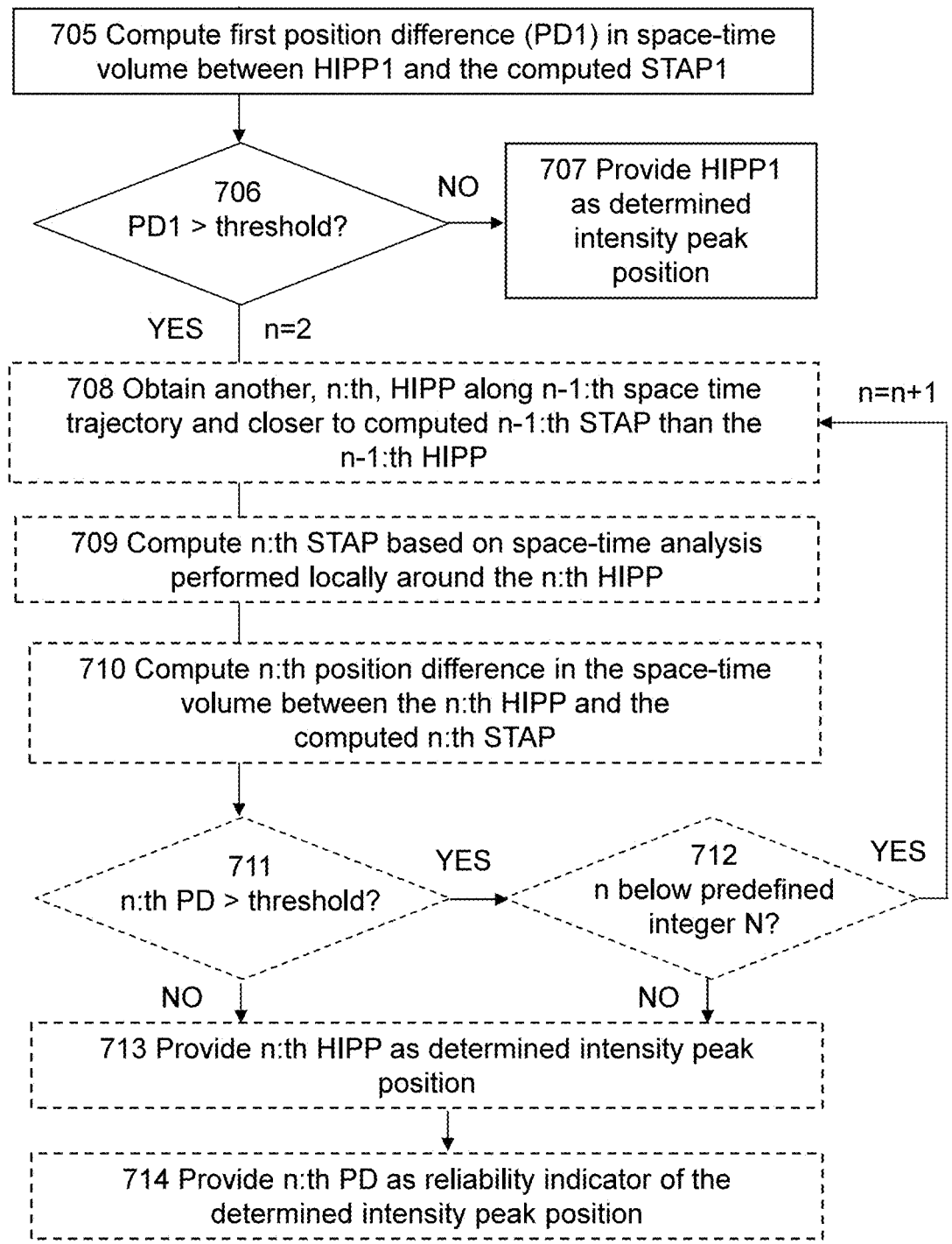

FIGS. 7A-C are flowcharts schematically illustrating embodiments of a method based on the above and according to embodiments herein. The actions below, which may form the method, are for determining information regarding an intensity peak position in a space-time volume (STV) formed by image frames. The image frames are generated by an image sensor, e.g. the image sensor 331, from sensing of light reflected from a measure object, e.g. the measure object 320, as part of light triangulation. The space time volume and image frames may be as in the above examples, e.g. correspond to the STV 360 or the pSTV 361. In practice, and as mentioned above, the space time volume and image frames here are typically part of and is a portion of a larger space time volume, e.g. pSTV 361 part of the STV 360 that is formed by a larger number of image frames imaging the complete measure object. For example, part of larger a sequence of image frames IM1 . . . IMi, where i=1 . . . M, and M is an integer in the magnitude of hundred or more. The light triangulation should, as in the prior art and conventional light triangulation, be performed under known operating conditions. Said light triangulation as such may be as in the prior art and thus involves movement of at least a light source, e.g. the light source 310 and/or the measure object 320 in relation to each other, so that at different consecutive time instants, different consecutive portions of the measure object are illuminated by the light source. Reflected light from the measure object is sensed by the image sensor. The light from the light source may be as in conventional light triangulation, for example structured light, such as a light line and/or laser light. In light triangulation, typically, but not necessary, the camera 330 and light source 310 are fixed in relation to each other and the measure object move in relation to these. It is also e.g. possible to move e.g. the light source with or without the camera. Through said sensing by the image sensor 331, respective image frame IMi of the STV is associated both with a respective such time instant, e.g. ti, and with a respective portion of the measure object 320 from which the image sensor 331 sensed light at the respective time instant ti. The STV is further associated with space-time trajectories, corresponding to e.g. 262 and 362, relating to how feature points of the measure object map to positions in the space-time volume. The space time trajectories are thus the same kind of trajectories as defined and used in prior art space time analysis and information about, e.g. identifying them, can be obtained the same or similarly as in the prior art. This include obtaining them analytically based on geometries of the measuring system 300, including information given by said known operating conditions, such as in the original space time analysis paper mentioned in the Background, or obtaining them through calibration and use of a reference object as described in EP 2 063 220 B1 also mentioned in the Background.

The method and/or actions below and indicated in FIGS. 5A-C may be performed by device(s), i.e. one or more devices, such as the camera 330 and/or the computing device 301, or by the imaging system 300 and/or suitable device(s) thereof, or connected to it. Device(s) for performing the method and actions thereof are further described below.

Note that the actions below may be taken in any suitable order and/or be carried out fully or partly overlapping in time when this is possible and suitable.

Action 701

A first hypothetical intensity peak position (HIPP1) in said STV is obtained. The HIPP1 may here and in the following be exemplified by the HIPP1 551a or HIPP1 651a. In some embodiments, the HIPP1 is in a line of pixels of an image frame part of said STV. That is, the HIPP1 corresponds to a point in three dimensions, such as in (u, v, t) coordinates, which point belong to a position in a certain image frame and to a time instant associated with when the image data of this position was captured, corresponding to when the light resulting in the image data was sensed by the image sensor. Typically there is one and the same time instant associated with all positions part of the same image frame. For example, as above, an image frame IMi is associated with a time ti etc. The HIPP1 is advantageously selected in the line of pixels, preferably as a position with high or at least higher probability than other positions in the line to be or be close to an actual, i.e. real, intensity peak position. Preferably it is selected by means of and/or based on a conventional peak finding algorithm.

Action 702

A first space time analysis position (STAP1) is computed based on space-time analysis performed locally around HIPP1 and along a first space time trajectory that is a space time trajectory of said space time trajectories that is associated with the HIPP1. The STAP1 may here and in the following be exemplified by the STAP1 552a or STAP1 652a.

As used herein, performance locally around a hypothetical intensity peak position refers to that the space time analysis is performed in a partial space time volume, i.e. pSTV, along a partial space time trajectory therein. The pSTV may here and in the following be exemplified by the pSTV 361 and the partial space time trajectory by the partial space time trajectory 362. Said pSTV thus being comprised in a greater space time volume, e.g. the STV 360, imaging the complete measure object, e.g. the measure object 320. The space time analysis can thus be understood to be performed in the pSTV and using image data from images frames forming the pSTV, which are only part, or subsequence, of image frames forming the greater STV. Typically this means that the space time analysis uses image data from a subsequence of image frames associated with a time interval in the greater space-time volume, covering some image frames from both before and after the HIPP, for example, but not necessary, symmetrically around the hypothetical peak position.

As used herein, and as should be realized from the description and examples herein, space time analysis position (STAP) refers to a center position of a light, e.g. intensity, distribution in a space-time volume along a space-time trajectory in that space-time volume. A STAP can thus be determined, such as found or identified, by computation based on space-time analysis, i.e. analysis in space-time, along a space-time trajectory in the space-time volume, such as in the prior art mentioned the Background. Given a space time volume and a space-time trajectory in that space-time volume any STAP along the space-time trajectory in the space-time volume can be computed, i.e. be determined by computation, based on the same principles and/or methods as in the prior art regarding similar space-time analysis, such as mentioned in the Background. The STAP may thus e.g. be computed based on finding, e.g. identifying, a center position of a light, such as intensity, distribution along the given space-time trajectory in the given space-time volume. As should be realized, the light distribution in the space time volume may be available from image data of image frames forming the space-time volume and interpolation, and can also be based on knowledge of expected or known type of light distribution, e.g. Gaussian distribution, and/or expected or known shape of light distribution.

Action 703

Said information regarding the intensity peak position is determined based on the HIPP1 and the computed STAP1.

Action 704

In some embodiments, Action 703, i.e. the determination of the information regarding the intensity peak position, comprises to provide a comparison between the HIPP1 and the computed STAP1 as a reliability indicator indicating how reliable the HIPP1 is as intensity peak position. The comparison may be such position difference, PD, mentioned elsewhere herein, but it is realized that also other comparisons can be used or provided, for example simply a set of coordinates of both HIPP1 and STAP1 in the STV, all or some coordinates that differ, difference per each of one or many coordinates, one or more ratios between HIPP1 and STAP1 coordinates etc.

These embodiments, may be particularly advantageous when HIPP1 has been determined by a conventional peak finding algorithm as explained above since it provides valuable information about how good or bad the algorithm was in finding a reliable peak position and/or for identifying a problematic peak position so it e.g. can be excluded and not used, or be rectified and/or replaced. The greater difference indicated by the comparison, the less reliable peak position, while indicated smaller or no substantial difference, the more reliable peak position.

Action 705

In some embodiments, Action 703, i.e. the determination of the information regarding the intensity peak position, comprises to compute a first position difference (PD1), e.g. PD1 553a or PD1 653a, in the space-time volume between the HIPP1 and the computed STAP1.

Action 706

In some embodiments, it is checked if the computed PD1 is above or below a certain threshold value.

If the computer PD1 equals the threshold value it is a matter of definition, and implementation, if actions to be taken should be the same as if the computer PD1 is below or above the threshold value.

Action 707

In some embodiments, if the computed PD1 is not above the threshold and e.g. below the threshold, the HIPP1 is provided as a determined intensity peak position.

In other words, Actions 706-707 can be summarized as the HIPP1 may be provided as a determined intensity peak position if the computed PD1 is below a certain threshold value.

Further, in some embodiments, if the computed PD1 is above said certain threshold value, some or all of Actions 708-714 may be performed at least once, starting with n=2:

Action 708

In some embodiments, another, new, n:th HIPP is obtained along a n−1:th space time trajectory and closer to the computed n−1:th STAP than the n−1:th HIPP.

Hence, for example:

In a first iteration where n=2, a HIPP2, e.g. HIPP2 551*b* or HIPP2 651*b*, is obtained along the first space time trajectory, i.e. the one used in Action 702, and closer to the computed STAP1, e.g. STAP1 552*a* or STAP1 652*a*, than the HIPP1, e.g. HIPP1 551*a* or HIPP1 651*a*.

In a second iteration where n=3, thus after Actions 708-711 first have been performed for n=2, a HIPP3, e.g. HIPP3 551*c* or HIPP3 651*c*, is obtained along the second space time trajectory, i.e. a space time trajectory of said space time trajectories and that is associated with the HIPP2 and that was used to compute a STAP2 in Action 809 during the first iteration. The HIPP3 is obtained, e.g. selected, closer to the computed STAP2 than the HIPP2, e.g. HIPP2 551*b* or HIPP2 651*b*.

Etc.

Action 709

In some embodiments, an n:th STAP is computed based on space-time analysis performed locally around the n:th HIPP and along a n:th space time trajectory. The n:th space time trajectory is a space time trajectory of said space time trajectories that is associated with the n:th hypothetical intensity peak position.

Hence, for example:

In the first iteration where n=2, a STAP2, e.g. STAP2 552*b* or STAP2 652*b*, is computed based on space-time analysis performed locally around the HIPP2, e.g. HIPP2 551*b* or HIPP2 651*b*, and along a second space time trajectory. The second space time trajectory being a space time trajectory of said space time trajectories that is associated with the HIPP2.

In the second iteration where n=3, thus after Actions 708-711 first have been performed for n=2, a STAP3, e.g. STAP3 552*c* or STAP3 652*c*, is computed based on space-time analysis performed locally around the HIPP3, e.g. HIPP3 551*c* or HIPP3 651*c*, and along a third space time trajectory. The third space time trajectory being a space time trajectory of said space time trajectories that is associated with the HIPP3.

Etc.

Action 710

In some embodiments, an n:th PD is computed. The n:th PD is a difference between the n:th hypothetical intensity peak position and the computed n:th space time peak position.

Hence, for example:

In the first iteration where n=2, a PD2, e.g. PD2 553*b* or PD2 653*b*, is computed. The PD2 being a difference between the HIPP2, e.g. HIPP2 551*b* or HIPP2 651*b*, and the computed STAP2, e.g. 552*b* or 652*b*.

In the second iteration where n=3 (thus after Actions 708-711 first have been performed for n=2), a PD3, e.g. PD3 553*c* or PD3 653*b*, is computed. The PD3 being a difference between the HIPP3, e.g. HIPP3 551*c* or HIPP3 651*c*, and the computed STAP3, e.g. 552*c* or 652*c*.

Etc.

Action 711

In some embodiments, it is checked if the computed n:th PD is above or below said certain threshold value, i.e. same threshold as used in Action 706.

If the computed n:th PD equals the threshold value it is a matter of definition and implementation if actions to be taken should be the same as if the computed PD1 is below or above the threshold value.

In some embodiments, if the computed n:th PD is above, or in some of these embodiments equal to, said certain threshold value, another iteration starting with Action 708 may take part, now with n=n+1, or Action 712 may first be performed.

In some embodiments, if the computed n:th PD instead is below, or in some of these embodiments and/or equal to, said certain threshold value, Action 713 and/or Action 714 are performed.

Action 712

In some embodiments, it is checked if n is below a predefined, or predetermined, integer N, or it is checked that n is below or equal to N. Note that if n equals N it is a matter of definition and implementation if actions to be taken should be the same as if n is below or above N.

For example, say that N=3, it is checked if n is below N and it is the first iteration, i.e. iteration 1, where n=2. This will thus result in that n is below N, but for iteration 2 where n=3 this is would no longer be the case.

In some embodiments, if n is below, or in some of these embodiments equal to, N, another iteration starting with Action 708 may take part, now with n=n+1.

In some embodiments, if n instead is above, or in some of these embodiments equal to, N, Action 713 and/or Action 714 are performed.

Note that in some embodiments, not illustrated by the figure, Actions 712 and 711 are in reverse order, e.g. have swapped place with each other, although it may be beneficial to, as shown in the figure, first check against the threshold.

Action 713

The n:th, corresponding to a last obtained, HIPP is provided as a determined intensity peak position, i.e. similar as in Action 707 but now for another HIPP after one or more improving iterations.

For example:

If this happens in the first iteration where n=2, the HIPP2 is provided as the determined intensity peak position.

If this instead happens in the second iteration where n=3, the HIPP3 is provided as the determined intensity peak position.

In some embodiments, if n is equal to, or above, the predefined integer N, as checked in Action 712, the last HIPP, i.e. the n:th HIPP, is associated with unreliability. That is, the n:th HIPP may be provided as determined intensity peak position after one or more iterations even if the n:th PD is above the threshold, but is then associated with unreliability, i.e. that the n:th HIPP is unreliable, e.g. that the n:th HIPP is not or is likely not an actual or accurate peak position, since the n:th PD was below the threshold even after one or more iterations.

Action 714

In some embodiments, the last computed PD, i.e. the first or n:th PD when iterations have stopped, is provided as a reliability indicator of the determined intensity peak position, i.e. of the HIPP that was provided as the determined intensity peak position in Action 707 or Action 713.

Part of what has been disclosed above in connection with Actions 711-714 can be summarized as follows:

The n:th HIPP may be provided as a determined intensity peak position if the computed n:th PD is below, and/or equal to, said certain threshold value. In that case no more iterations are performed.

If the computed n:th PD instead is above said certain threshold, another iteration may be performed with n=n+1, i.e. some or all of Actions 708-712 may be performed again but now with n=n+1. Hence after the first iteration 1 with n=2, the second iteration 2 may be performed with n=3. In some embodiments for this to happen, i.e. perform another iteration, it is also required that n is below, or below or equal to, the predefined integer N>2, i.e. as checked in Action 712.

Note that for efficiency and simplified implementation, the position differences, i.e. PDs, in the examples above may be computed only for time coordinates, i.e. only be a position difference in time, i.e. time difference, between positions in the space time volume. In other embodiments, differences involving all coordinates, or other coordinate(s), than time are computed and used.

Figure 8A:
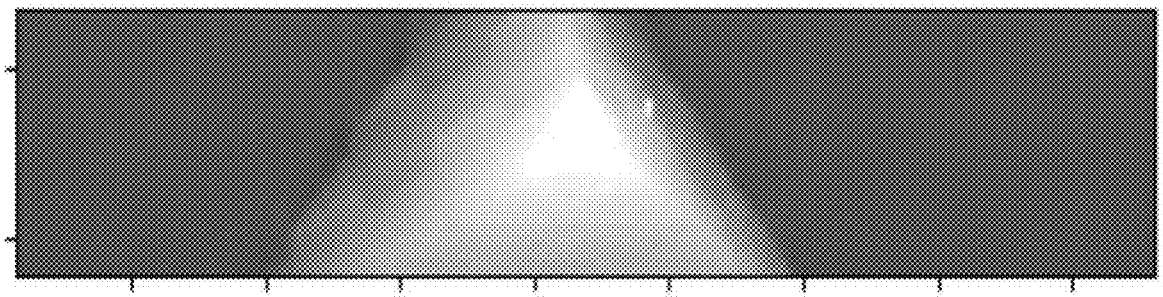
FIGS. 8A-B show a result from light triangulation when a conventional peak finding algorithm has been used for qualitative comparison with a result when embodiments herein have been applied.
Figure 8B:
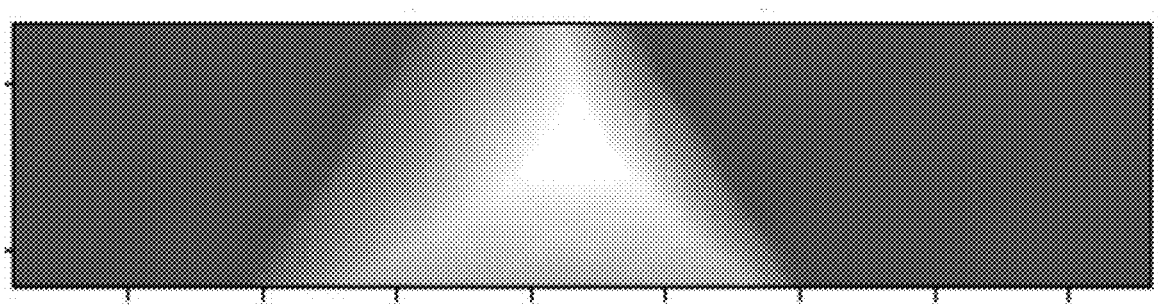
Figure 8B:
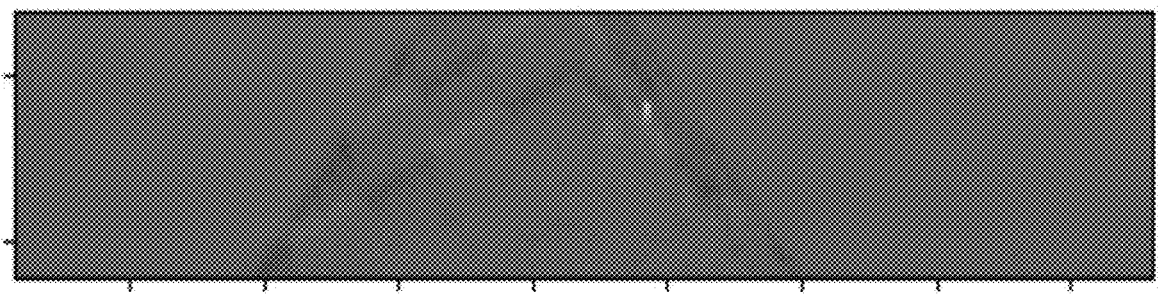

FIGS. 8A-B show a result from light triangulation when a conventional peak finding algorithm has been used for qualitative comparison with a result when embodiments herein have been applied. The same image sequence has been used in both cases, corresponding to output from a light triangulation imaging system as described above.

FIG. 8A is the result when peak positions found by a conventional peak finding algorithm have been used to form the shown image. Intensity is in the shown image proportional to height or depth. The imaged pyramid can be seen to have some variations on some of the sloped surfaces due to that the conventional peak finding algorithm have had problems to deal with a checker pattern on these sloped surfaces.

FIG. 8B, the upper picture, is the result when peak positions have been determined by iteratively and locally applying space time analysis according to embodiments herein and then the shown figure has been produced based on the determined positions. There is no identifiable and undesirable variation on the sloped surfaces as in FIG. 8A, and at least to a much lower extent than in FIG. 8A. Embodiments herein can thus provide better results and 3D images than conventional algorithms.

FIG. 8B, the lower part, illustrates resulting position differences (PDs) in time for the last HIPPs, i.e. the ones used to determine the peak positions that the upper image of FIG. 8A is based on. This is an example that corresponds to Action 714. Intensity is in the shown image proportional to size of the difference. Some areas of low intensity variations can be identified, thus corresponding to determined peak positions according to embodiments herein with some but relatively small position difference between HIPP and STAP. The variations and differences are especially on the surfaces where the conventional peak finding algorithm had even greater problems, which is expected.

Please note that there is an error on the right side of the pyramid, in both FIG. 8A with result from conventional peak finding in FIG. 8A and the upper picture of FIG. 8B with result based on embodiments herein. This could e.g. be due to some undesired reflections when the images used were captured. This also causes a clear indication of the problem in the lower position difference picture of FIG. 8B. Hence, if the resulting position differences are used as indication of reliability of determined peak positions, the positions with this error can easily be identified in the upper 3D image of FIG. 8B and that data be excluded in the 3D image, or marked up, or replaced by values interpolated from surrounding positions, depending on what is desirable and suitable depending on what the 3D image is to be used for.

Figure 9:
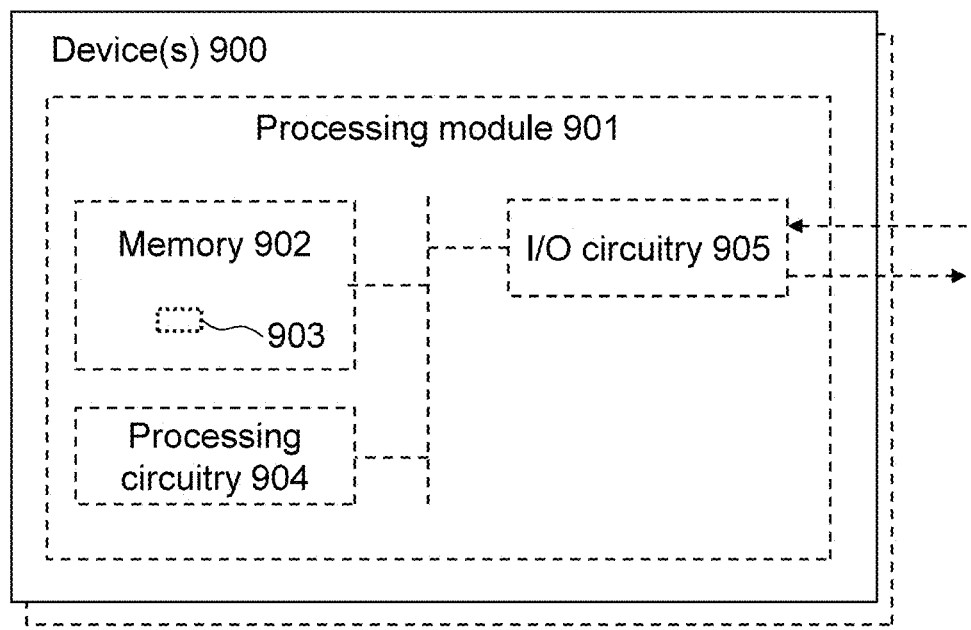
FIG. 9 is a schematic block diagram for illustrating embodiments of how one or more devices may be configured to perform the method and actions discussed in relation to FIGS. 8A-B.

FIG. 9 is a schematic block diagram for illustrating embodiments of one or more devices 900, i.e. device(s) 900, that may correspond to devices(s) already mention in the above for performing embodiments herein, such as for performing the method and/or actions described above in relation to FIGS. 7A-C. The device(s) may e.g. correspond to the computing device 301 and/or the camera 330, or the devices forming the imaging system 300.

The schematic block diagram is for illustrating embodiments regarding how the device(s) 900 may be configured to perform the method and actions discussed above in relation to FIGS. 7A-C. Hence, the device(s) 900 is for determining information regarding said intensity peak position in said space-time volume formed by said image frames. The image frames generated by said image sensor 331 from sensing of light reflected from said measure object as part of light triangulation. That is, as already described above for FIGS. 7A-C, where the light triangulation involves movement of said at least light source 310 and/or said measure object 320 in relation to each other, so that at different consecutive time instants, different consecutive portions of the measure object 320 are illuminated by the light source 310 and reflected light from the measure object 320 is sensed by the image sensor. Through said sensing by the image sensor 331, each image frame of the space time volume is associated both with a respective such time instant, e.g. t, and with a respective portion of the measure object 320 from which the image sensor 331 sensed light at the respective time instant. Said space-time volume is further associated with said space-time trajectories relating to how feature points of the measure object map to positions in the space-time volume.

The device(s) 900 may comprise a processing module 901, such as processing means, one or more hardware modules, including e.g. one or more processing circuits, circuitry, such as processors, and/or one or more software modules for performing said method and/or actions.

The device(s) 900 may further comprise memory 902 that may comprise, such as contain or store, a computer program 903. The computer program 903 comprises 'instructions' or 'code' directly or indirectly executable by the device(s) 900 to perform said method and/or actions. The memory 902 may comprise one or more memory units and may further be arranged to store data, such as configurations, data and/or values, involved in or for performing functions and actions of embodiments herein.

Moreover, the device(s) 900 may comprise processing circuitry 904 involved in processing and e.g. encoding data, as exemplifying hardware module(s) and may comprise or correspond to one or more processors or processing circuits. The processing module(s) 901 may comprise, e.g. 'be embodied in the form of' or 'realized by' the processing circuitry 904. In these embodiments, the memory 902 may comprise the computer program 903 executable by the processing circuitry 1204, whereby the device(s) 900 is operative, or configured, to perform said method and/or actions thereof.

Typically the device(s) 900, e.g. the processing module(s) 901, comprises an Input/Output (I/O) module(s) 905, configured to be involved in, e.g. by performing, any communication to and/or from other units and/or devices, such as sending and/or receiving information to and/or from other devices. The I/O module(s) 905 may be exemplified by obtaining, e.g. receiving, module(s) and/or providing, e.g. sending, module(s), when applicable.

Further, in some embodiments, the device(s) 900, e.g. the processing module(s) 901, comprises one or more of obtaining module(s), computing module(s), determining modules(s), performing module(s), associating module(s), and providing module(s), as exemplifying hardware and/or software module(s) for carrying out actions of embodiments herein. These modules may be fully or partly implemented by the processing circuitry 904.

Hence:

The device(s) 900, and/or the processing module(s) 901, and/or the processing circuitry 904, and/or the I/O module(s) 905, and/or the obtaining module(s) may be operative, or configured, to, obtain said first hypothetical intensity peak position, HIPP1, in said space time volume (STV).

The device(s) 900, and/or the processing module(s) 901, and/or the processing circuitry 904, and/or the computing module(s) may be operative, or configured, to compute said first space time analysis position, STAP1, based on the space-time analysis performed locally around said first hypothetical intensity peak position, HIPP1, and along said first space time trajectory.

The device(s) 900, and/or the processing module(s) 901, and/or the processing circuitry 904, and/or the determining module(s) may be operative, or configured, to determine said information regarding the intensity peak position based on the first hypothetical intensity peak position, HIPP1, and the computed first space time analysis position, STAP 1.

In some embodiments, the device(s) 900, and/or the processing module(s) 901, and/or the processing circuitry 904, and/or the computing module(s) are operative, or configured, to compute said first position difference, PD1.

In some embodiments, the device(s) 900, and/or the processing module(s) 901, and/or the processing circuitry 904, and/or the I/O module(s) 905, and/or the providing module(s) are operative, or configured, to, if said computed PD1 is below said certain threshold value, provide the HIPP1 as the determined intensity peak position.

In some embodiments, the device(s) 900, and/or the processing module(s) 901, and/or the processing circuitry 904, and/or the I/O module(s) 905, and/or the obtaining module(s), and/or the computing module(s), and/or the providing module(s),are operative, or configured, to, if the computed PD1 is above said certain threshold value and for at least, and/or starting with, n=2,
  obtain said another, new, n:th HIPP,
  compute said n:th space time analysis position, STAP,
  compute said n:th position difference, PD, and
  provide said n:th HIPP as the a determined intensity peak position if the computed n:th PD is below said certain threshold value.

In some embodiments, the device(s) 900, and/or the processing module(s) 901, and/or the processing circuitry 904, and/or the providing module(s) and/or the associating module(s) are operative, or configured, to, if n is above or equal to the predefined integer N, provide the n:th HIPP as the determined intensity peak position and associate the determined intensity peak position with said unreliability.

In some embodiments, the device(s) 900, and/or the processing module(s) 901, and/or the processing circuitry 904, the providing module(s), and/or the I/O module(s) 905, are operative, or configured, to provide said last computed PD as a reliability indicator of the determined intensity peak position.

Moreover, in some embodiments, the device(s) 900, and/ or the processing module(s) 901, and/or the processing circuitry 904, the providing module(s), and/or the I/O module(s) 905, are operative, or configured, to provide said comparison between the HIPP1 and the computed STAP1 as said reliability indicator.

Figure 10:
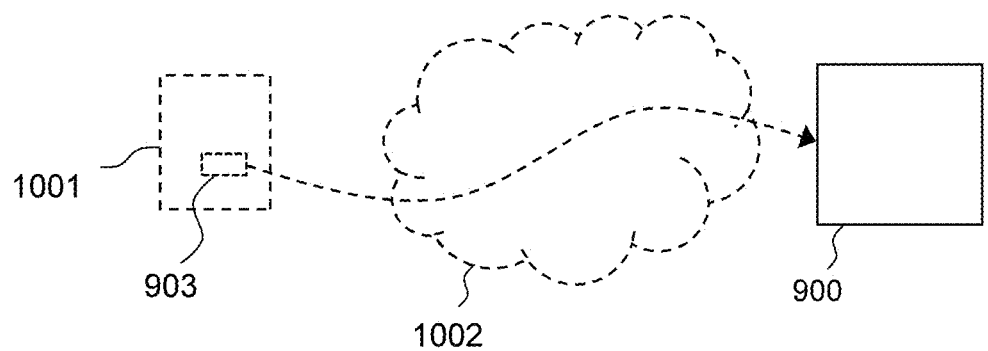
FIG. 10 is a schematic drawing illustrating some embodiments relating to computer program and carriers thereof to cause device(s) to perform the method and actions discussed in relation to FIGS. 8A-B

FIG. 10 is a schematic drawing illustrating some embodiments relating to computer program and carriers thereof to cause said device(s) 900 discussed above to perform said method and actions.

The computer program may be the computer program 903 and comprises instructions that when executed by the processing circuitry 904 and/or the processing module(s) 901, cause the device(s) 900 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 1001 as schematically illustrated in the figure. The computer program 903 may thus be stored on the computer readable storage medium 1001. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 1001 may be used for storing data accessible over a computer network 1002, e.g. the Internet or a Local Area Network (LAN). The computer program 903 may furthermore be provided as pure computer program(s) or comprised in a file or files. The file or files may be stored on the computer readable storage medium 1001 and e.g. available through download e.g. over the computer network 1002 as indicated in the figure, e.g. via a server. The server may e.g. be a web or File Transfer Protocol (FTP) server. The file or files may e.g. be executable files for direct or indirect download to and execution on said device(s) to make it perform as described above, e.g. by execution by the processing circuitry 904. The file or files may also or alternatively be for intermediate download and compilation involving the same or another processor(s) to make them executable before further download and execution causing said device(s) 900 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

We claim:

1. A method for determining information regarding an intensity peak position in a space-time volume formed by image frames generated by an image sensor from sensing of light reflected from a measure object as part of light triangulation, wherein said light triangulation is based on movement of at least a light source and/or the measure object in relation to each other so that at different consecutive time instants, different consecutive portions of the measure object are illuminated by the light source and reflected light from the measure object is sensed by the image sensor whereby each image frame of the space time volume is associated both with a respective such time instant and with a respective portion of the measure object from which the image sensor sensed light at the respective time instant, wherein said space-time volume is further associated with space-time trajectories relating to how feature points of the measure object map to positions in the space-time volume, wherein the method comprises:
obtaining a first hypothetical intensity peak position in said space time volume
computing a first space time analysis position based on space-time analysis performed locally around the first hypothetical intensity peak position and along a first space time trajectory that is a space time trajectory of said space time trajectories that is associated with the first hypothetical intensity peak position, and
determining said information regarding the intensity peak position based on the first hypothetical intensity peak position and the computed first space time analysis position wherein said determination comprises:
computing a first position difference in the space-time volume between the first hypothetical intensity peak position and computed first space time analysis position, and
if the computed first position difference is below a certain threshold value, providing the first hypothetical intensity peak position as a determined intensity peak position.

2. The method as claimed in claim 1, wherein the first hypothetical intensity peak position is in a line of pixels of an image frame that is part of said space-time volume.

3. The method as claimed in claim 1, wherein said determination of the information regarding the intensity peak position further comprises:
if the computed first position difference is above said certain threshold value, performing the following actions at least once and starting with n=2,
a) obtaining another, new, n:th hypothetical intensity peak position along the n−1:th space time trajectory and closer to the computed n−1:th space time analysis position hypothetical intensity peak position,
b) computing an n:th space time analysis position based on space-time analysis performed locally around the n:th hypothetical intensity peak position and along a n:th space time trajectory that is a space time trajectory of said space time trajectories that is associated with the n: th hypothetical intensity peak position,
c) computing an n:th position difference in the space-time volume between the n:th hypothetical intensity peak position and the computed n:th space time analysis position,
d) if the computed n:th position difference is below said certain threshold value, providing the n:th hypothetical intensity peak position as the determined intensity peak position, and
e) if the computed n:th position difference is above said certain threshold value, performing actions a-e) again with n=n+1.

4. The method as claimed in claim 3, wherein action e) comprises to perform action a-e) again only if also n is below a predefined integer N>2.

5. The method as claimed in claim 4, wherein action e) further comprises:
if n is above or equal to the predefined integer N, providing the n:th hypothetical intensity peak position as the determined intensity peak position and associating the n:th hypothetical intensity peak position with unreliability.

6. The method as claimed in claim 1, wherein said determination of the information regarding the intensity peak position further comprises:
providing the last computed position difference as a reliability indicator of the determined intensity peak position.

7. The method as claimed in claim 1, wherein said determination of the information regarding the intensity peak position comprises:
providing a comparison between the first hypothetical intensity peak position and the computed first space time analysis position as a reliability indicator indicating how reliable the first hypothetical intensity peak position is as intensity peak position.

8. A non-transitory computer readable storage medium comprising instructions that, when executed by one or more processors, causes the one or more processors to perform the method according to claim 1.

9. One or more devices for determining information regarding an intensity peak position in a space-time volume formed by image frames generated by an image sensor from sensing of light reflected from a measure object as part of light triangulation, wherein said light triangulation is based on movement of at least a light source and/or the measure object in relation to each other so that at different consecutive time instants, different consecutive portions of the measure object are illuminated by the light source and reflected light from the measure object is sensed by the image sensor whereby respective image frame of the space time volume is associated both with a respective such time instant and with a respective portion of the measure object from which the image sensor sensed light at the respective time instant, wherein said space-time volume is further associated with space-time trajectories relating to how feature points of the measure object map to positions in the space-time volume, wherein said one or more devices are configured to:

obtain a first hypothetical intensity peak position in said space time volume, compute a first space time analysis position (552a; 652a) based on space-time analysis performed locally around the first hypothetical intensity peak position and along a first space time trajectory that is a space time trajectory of said space time trajectories that is associated with the first hypothetical intensity peak position, and determine said information regarding the intensity peak position based on the first hypothetical intensity peak position and the computed first space time analysis position, wherein the one or more device are further configured to:

compute a first position difference in the space-time volume between the first hypothetical intensity peak position and the computed first space time analysis position, and if the computed first position difference is below a certain threshold value provide the first hypothetical intensity peak position as a determined intensity peak position.

10. The one or more devices as claimed in claim 9, wherein the first hypothetical intensity peak position is in a line of pixels of an image frame that is part of said space-time volume.

11. The one or more devices as claimed in claim 9, wherein said one or more devices being configured to determine the information regarding the intensity peak position further comprises that the one or more devices are configured to:

if the computed first position difference is above said certain threshold value, at least once and starting with n=2, a) obtain another, new, n:th hypothetical intensity peak position along the n−1:th space time trajectory and closer to the computed n−1:th space time analysis position than the n−1:th hypothetical intensity peak position, b) compute an n:th space time analysis position based on space-time analysis performed locally around the n:th hypothetical intensity peak position and along a n:th space time trajectory that is a space time trajectory of said space time trajectories that is associated with the n:th hypothetical intensity peak position, c) compute an n:th position difference in the space-time volume between the n: th hypothetical intensity peak position and the computed n:th space time analysis position, d) if the computed n:th position difference is below said certain threshold value, provide the n:th hypothetical intensity peak position as the determined intensity peak position, and e) if the computed n: th position difference is above said certain threshold value, perform a-e) again with n=n+1.

12. The one or more devices as claimed in claim 9, wherein said one or more devices being configured to determine the information regarding the intensity peak position comprises that the one or more device are configured to: provide a comparison between the first hypothetical intensity peak position and the computed first space time analysis position as a reliability indicator indicating how reliable the first hypothetical intensity peak position is as intensity peak position.

* * * * *